US006817650B2

(12) United States Patent
Cupelli et al.

(10) Patent No.: US 6,817,650 B2
(45) Date of Patent: Nov. 16, 2004

(54) ACCESSORY ATTACHMENT WINDER FOR INSTALLING, REMOVING AND STORING A VEHICLE COVERING

(75) Inventors: Philip L. Cupelli, 4203 Gravelly Hills Rd., Louisville, TN (US) 37777; Leslie P. Dreher, Dearborn Heights, MI (US); John Burke, New Baltimore, MI (US); Steven M. Knowles, Silver Lake, IN (US); Terrence D. Kalley, Troy, MI (US)

(73) Assignee: Philip L. Cupelli, Louisville, TN (US)

( * ) Notice: Subject to any disclaimer, the term of this patent is extended or adjusted under 35 U.S.C. 154(b) by 0 days.

(21) Appl. No.: 10/281,171

(22) Filed: Oct. 28, 2002

(65) Prior Publication Data

US 2004/0080177 A1 Apr. 29, 2004

(51) Int. Cl.⁷ .................................................. B60P 7/04
(52) U.S. Cl. ......................................... 296/98; 160/383
(58) Field of Search ............................... 296/98, 136.03, 296/136; 160/383, 382, 402; 114/108; 135/119

(56) References Cited

U.S. PATENT DOCUMENTS

| 2,976,082 | A | * | 3/1961 | Dahlman | 296/98 |
| 3,021,894 | A | * | 2/1962 | La Due | 160/23.1 |
| 4,036,521 | A | | 7/1977 | Clenet | |
| 4,046,416 | A | | 9/1977 | Penner | |
| 4,273,377 | A | | 6/1981 | Alexander | |
| 4,479,677 | A | | 10/1984 | Gulette et al. | |
| RE31,746 | E | | 11/1984 | Dimmer et al. | |
| 4,516,802 | A | | 5/1985 | Compton | |
| 4,730,866 | A | | 3/1988 | Nett | |
| 4,792,178 | A | | 12/1988 | Kokx | |
| 5,121,960 | A | | 6/1992 | Wheatley | |
| 5,350,213 | A | | 9/1994 | Bernardo | |
| 5,547,243 | A | * | 8/1996 | Lamb et al. | 296/98 |
| 5,584,523 | A | | 12/1996 | Kawaguchi | |
| 5,655,807 | A | | 8/1997 | Rosario | |
| 5,727,836 | A | | 3/1998 | Hosoya | |
| 5,788,315 | A | | 8/1998 | Tucker | |
| 6,619,719 | B1 | * | 9/2003 | Wheatley | 296/100.15 |

OTHER PUBLICATIONS

Brochure for ACCESS Roll–Up Cover, manufactured by Agri–Cover, Inc., 6 pages, (2000).
Brochure for LITERIDER Roll–Up Cover, manufactured by Agri–Cover, Inc., 4 pages, (2000).

* cited by examiner

Primary Examiner—Joseph D. Pape
(74) Attorney, Agent, or Firm—Steptoe & Johnson LLP

(57) ABSTRACT

An accessory attachment winding device with rolling and positioning capabilities for installing, removing and storing a tonneau cover or other vehicle covering is disclosed. The accessory system is provided with preferred features of integral-unitary construction or multiple base member construction with extending inter-fitting and sliding parts, so that the device can be adjusted in terms of position and dimension to connect and attach to complimentary coupling or connection portions of a tonneau, vehicle or other covering. In its method and function of operation the device houses and presents complimenting coupling members which can be adjusted in terms of their positional relationship as housed in a respective base member, or in terms of the extensible, sliding and positional features of the cooperating base members utilized in the method and device of the present invention.

34 Claims, 52 Drawing Sheets

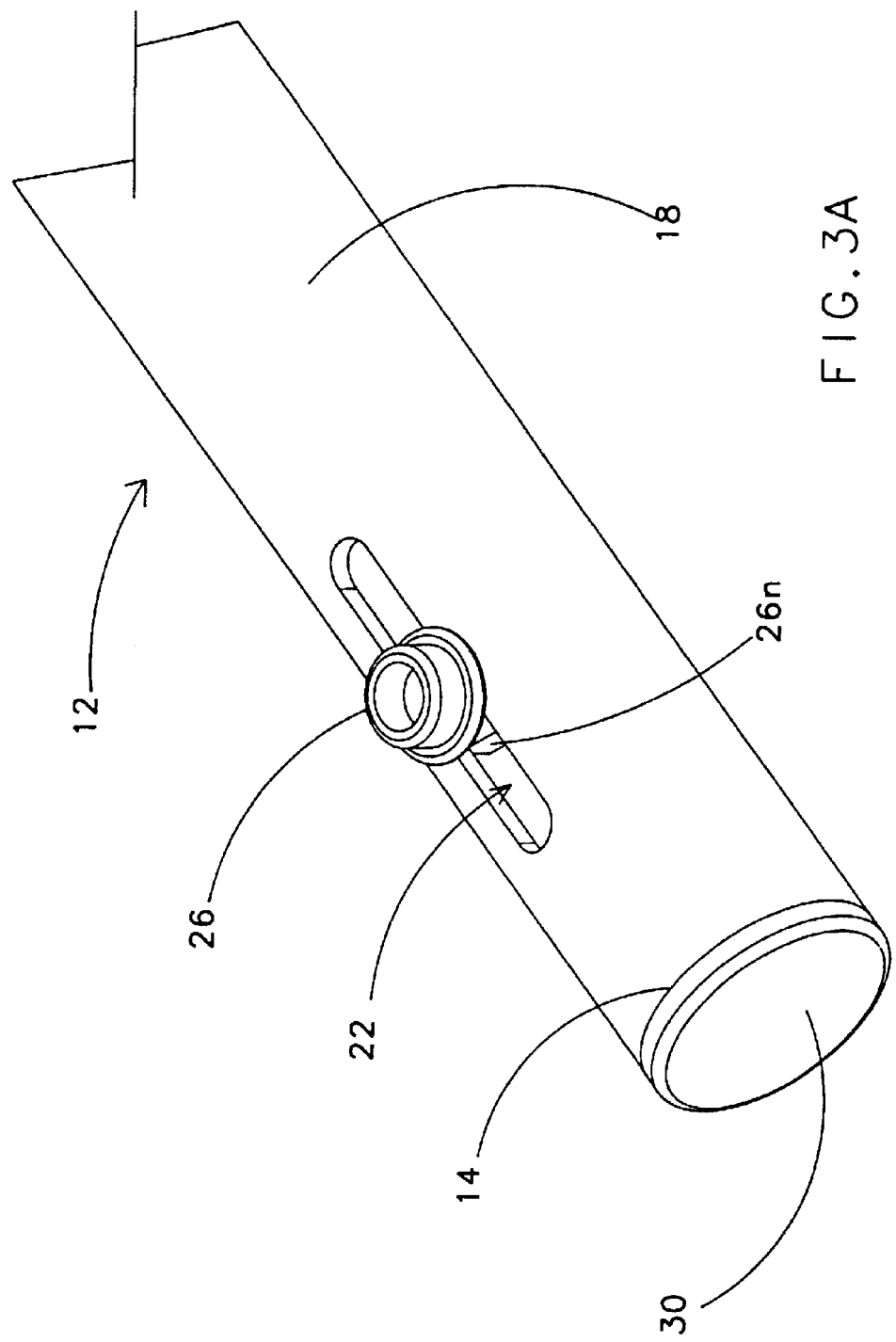

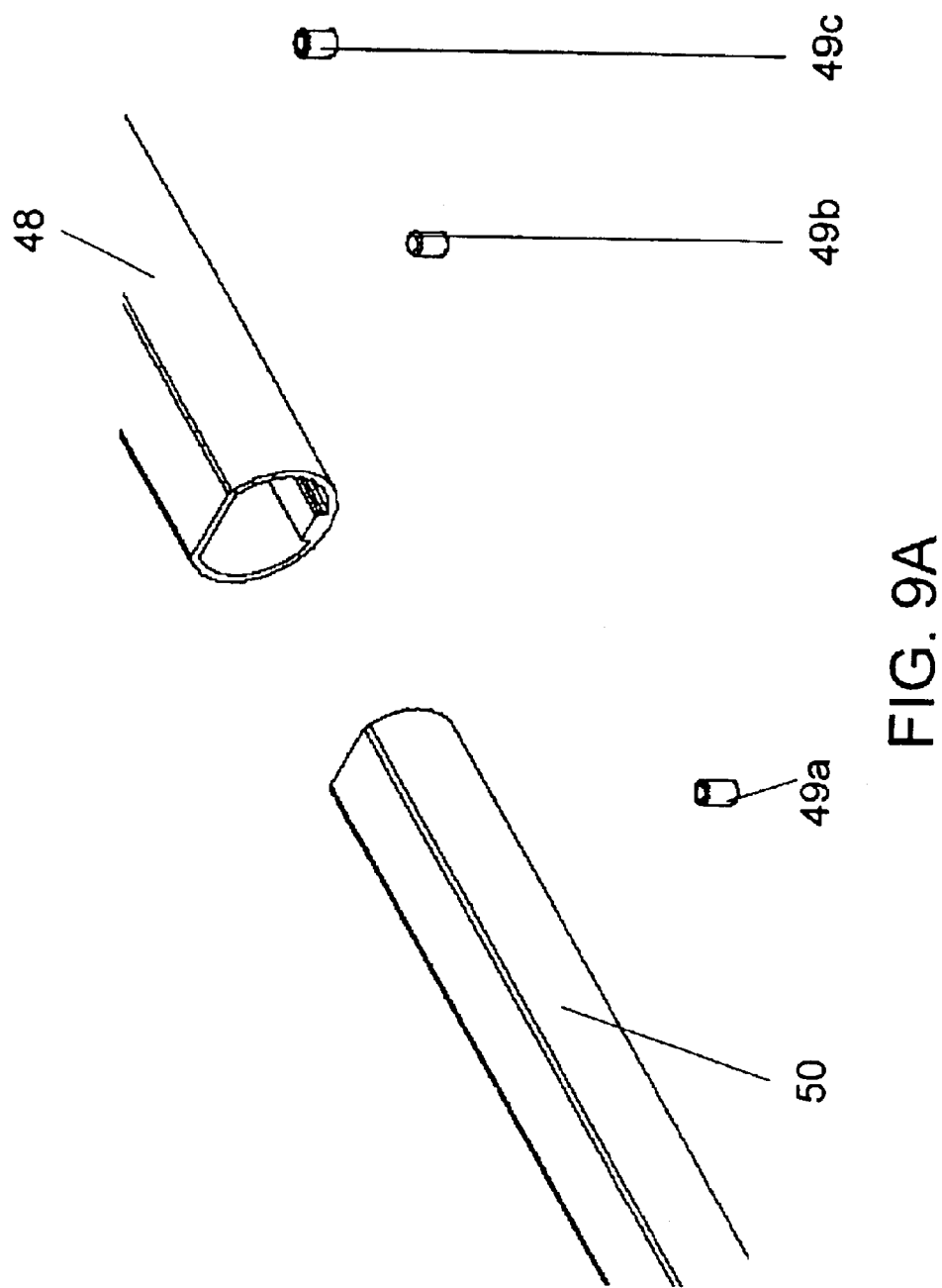

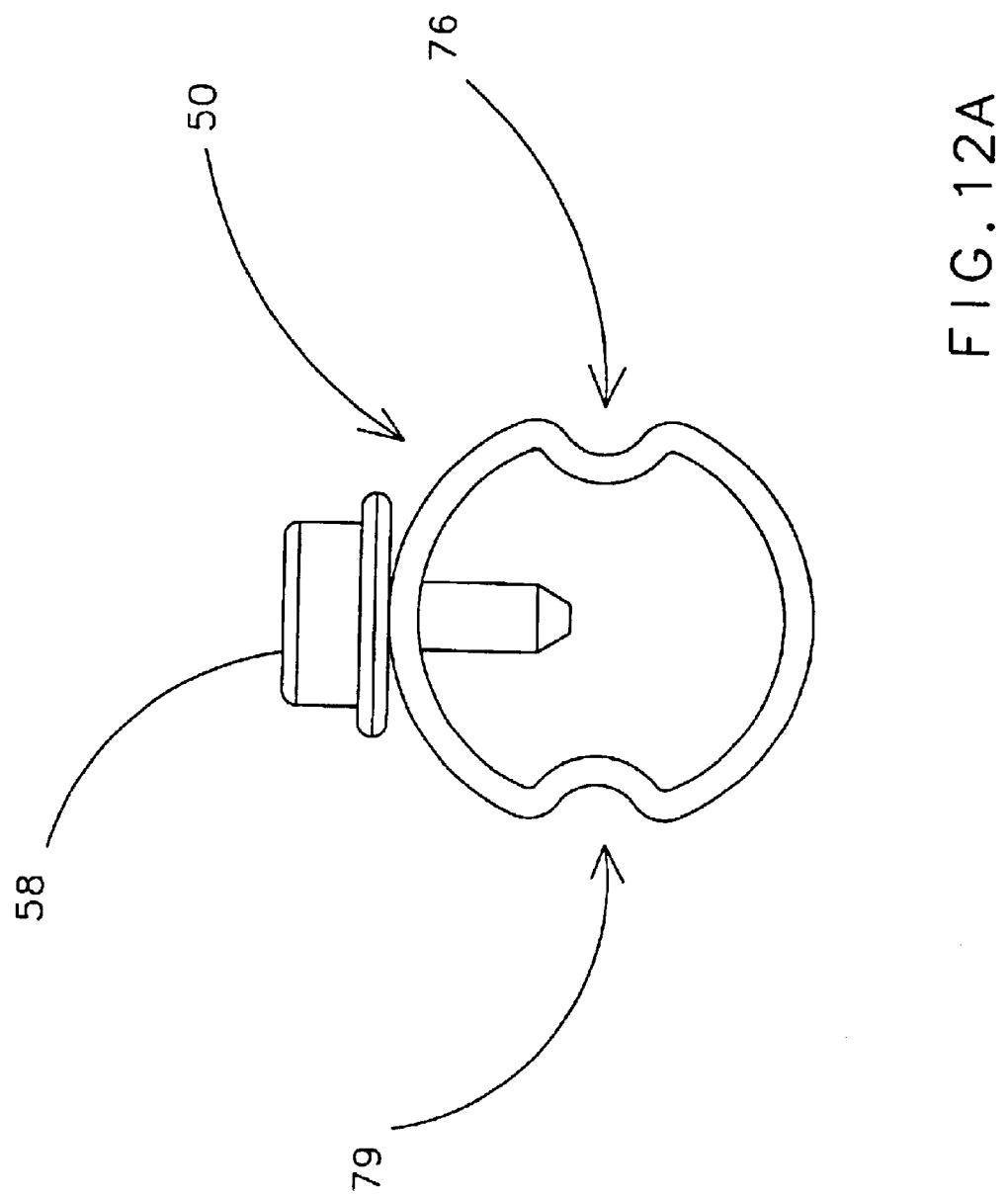

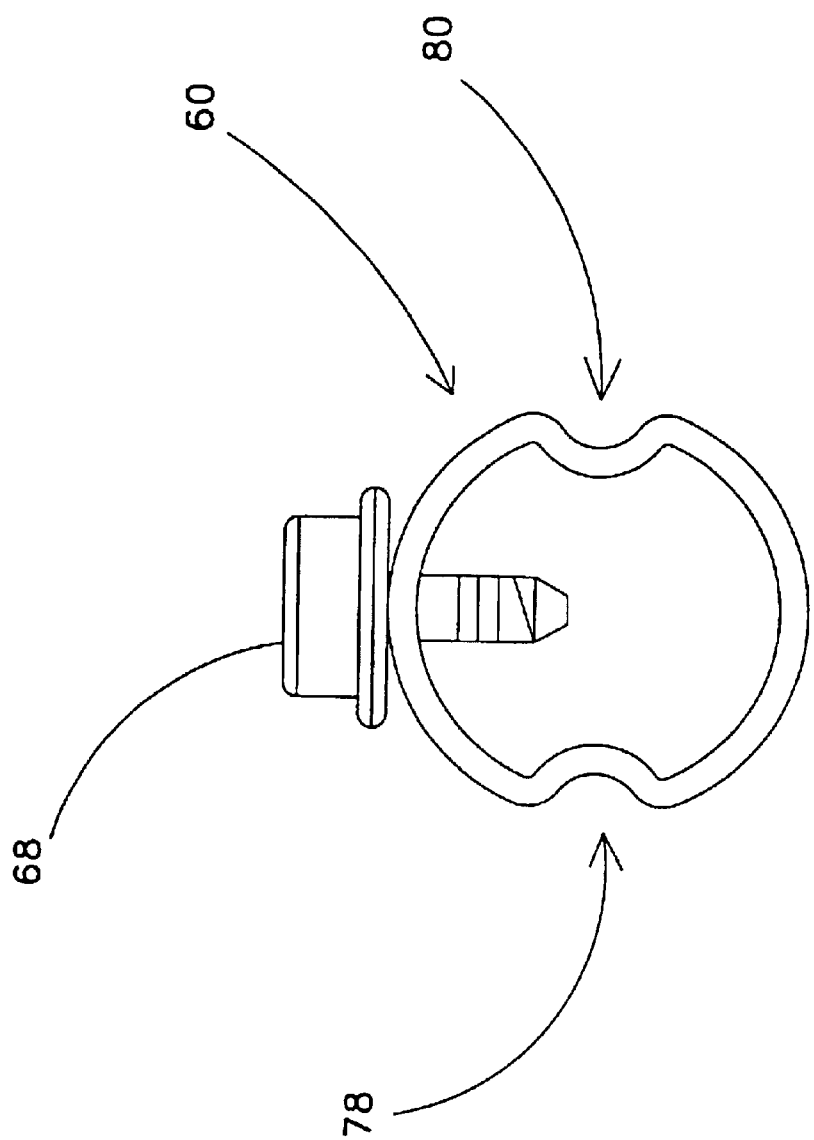

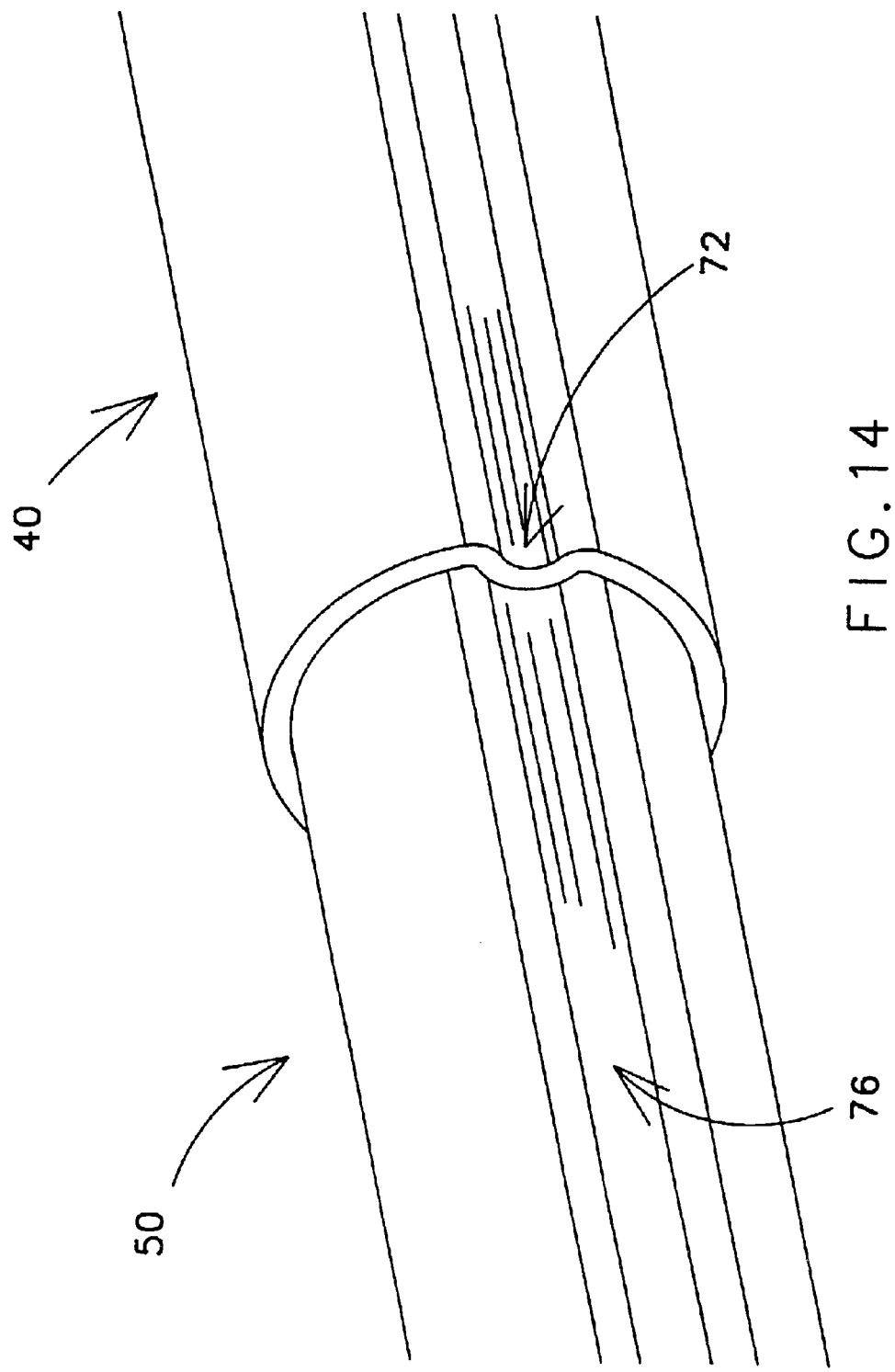

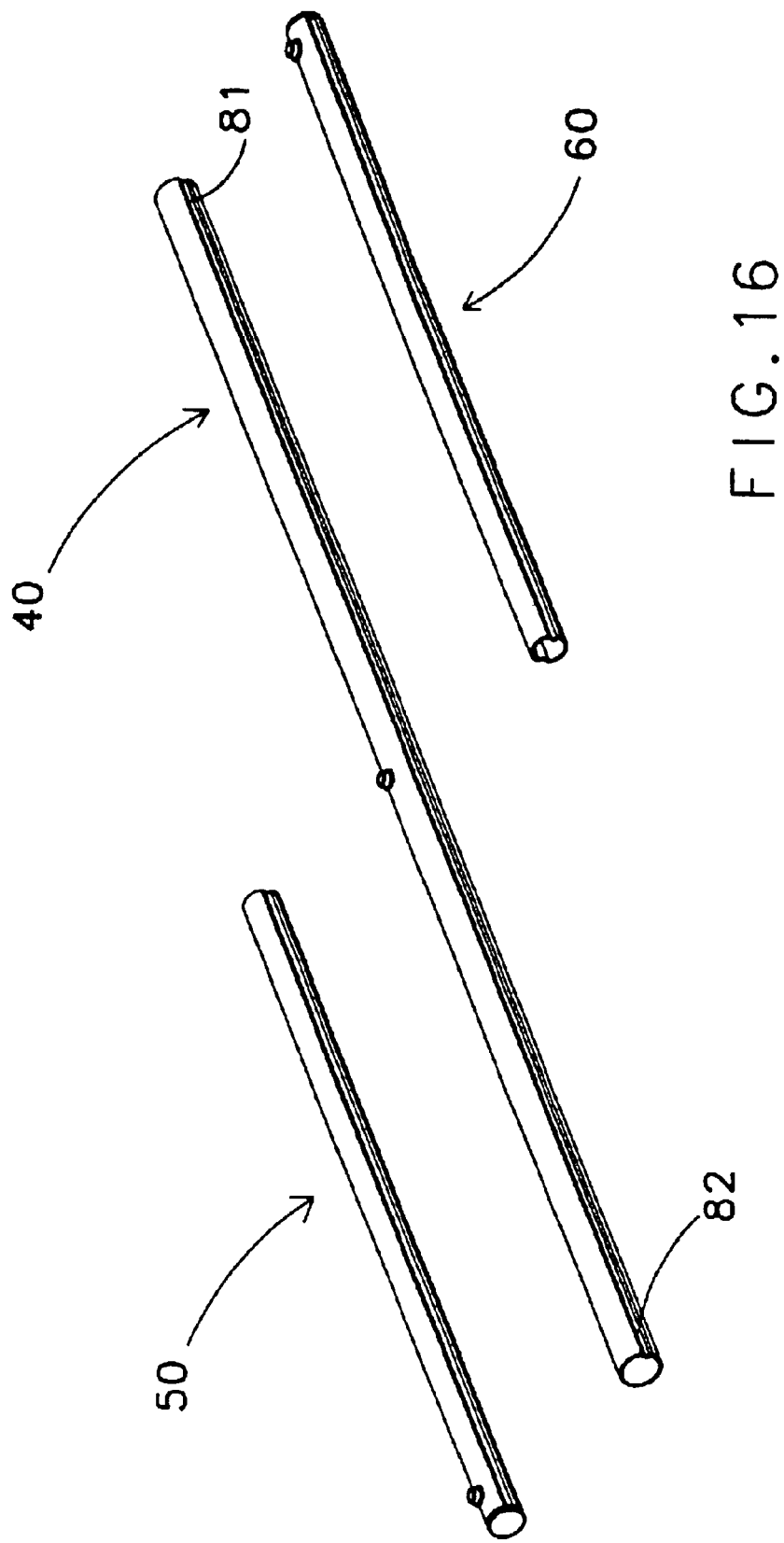

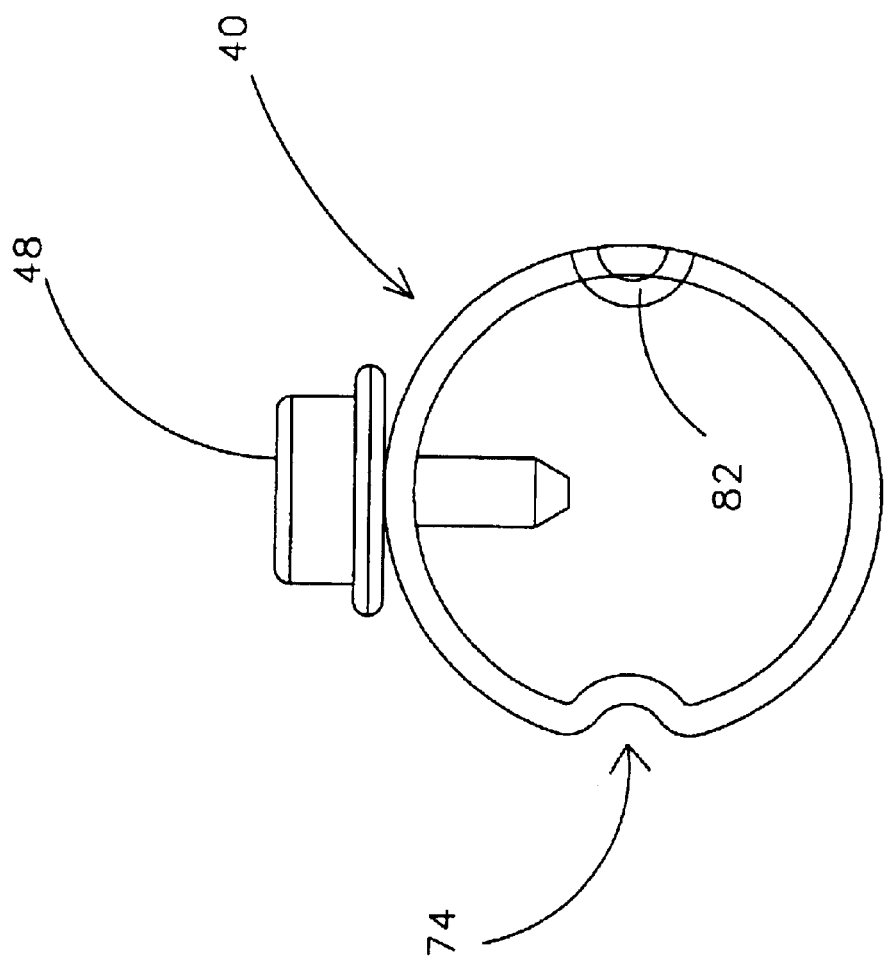

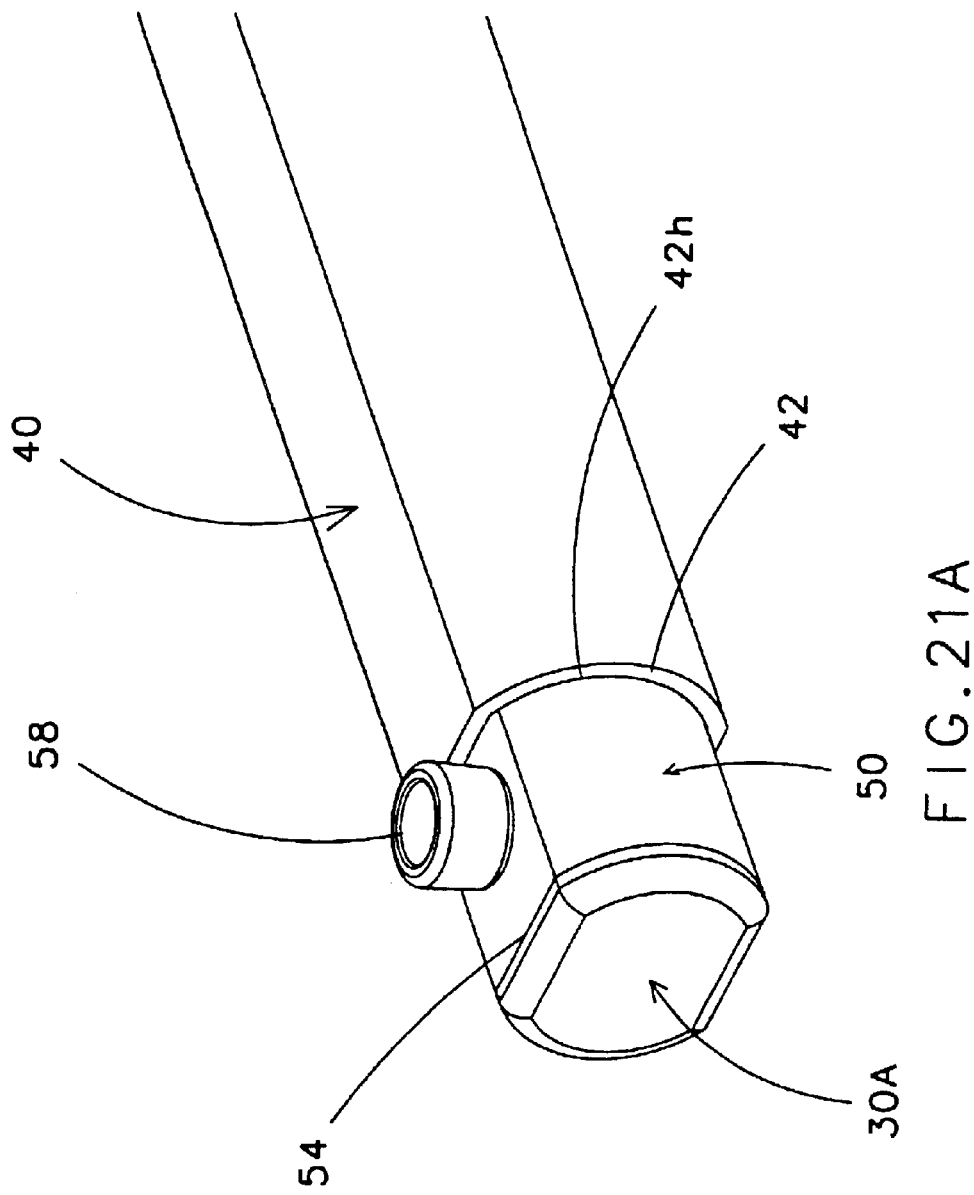

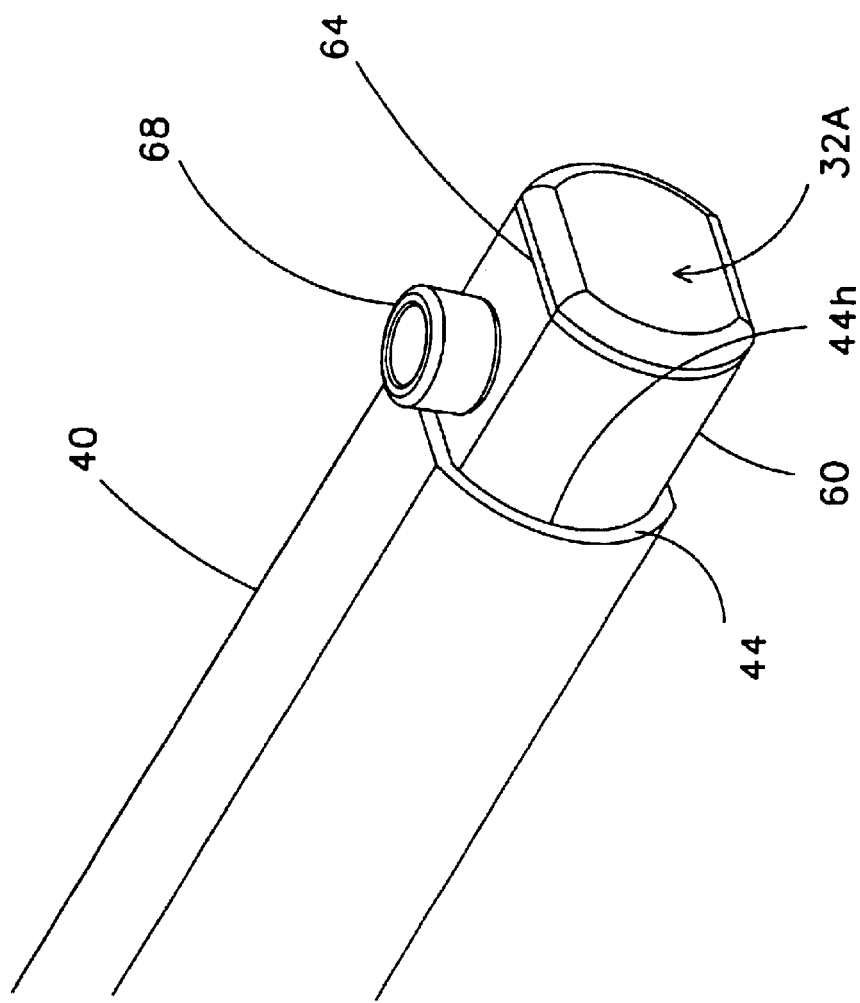

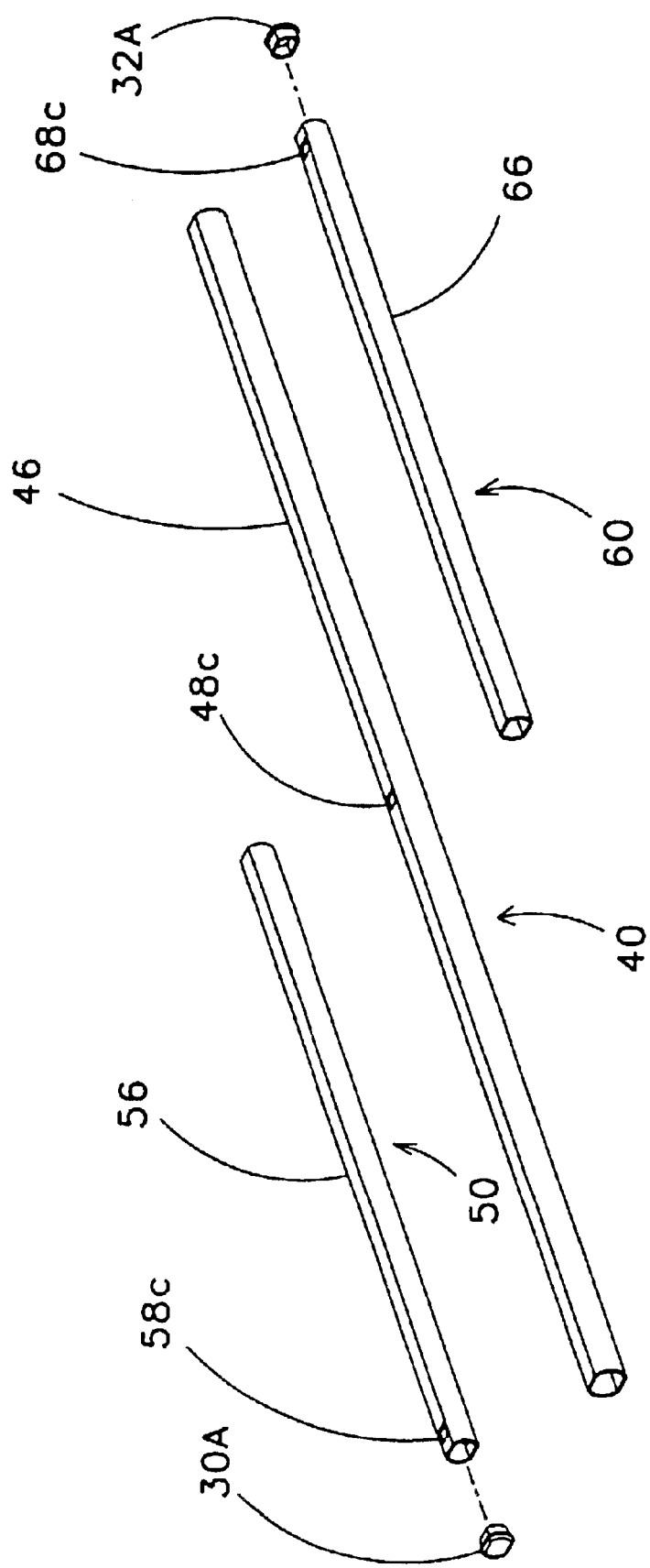

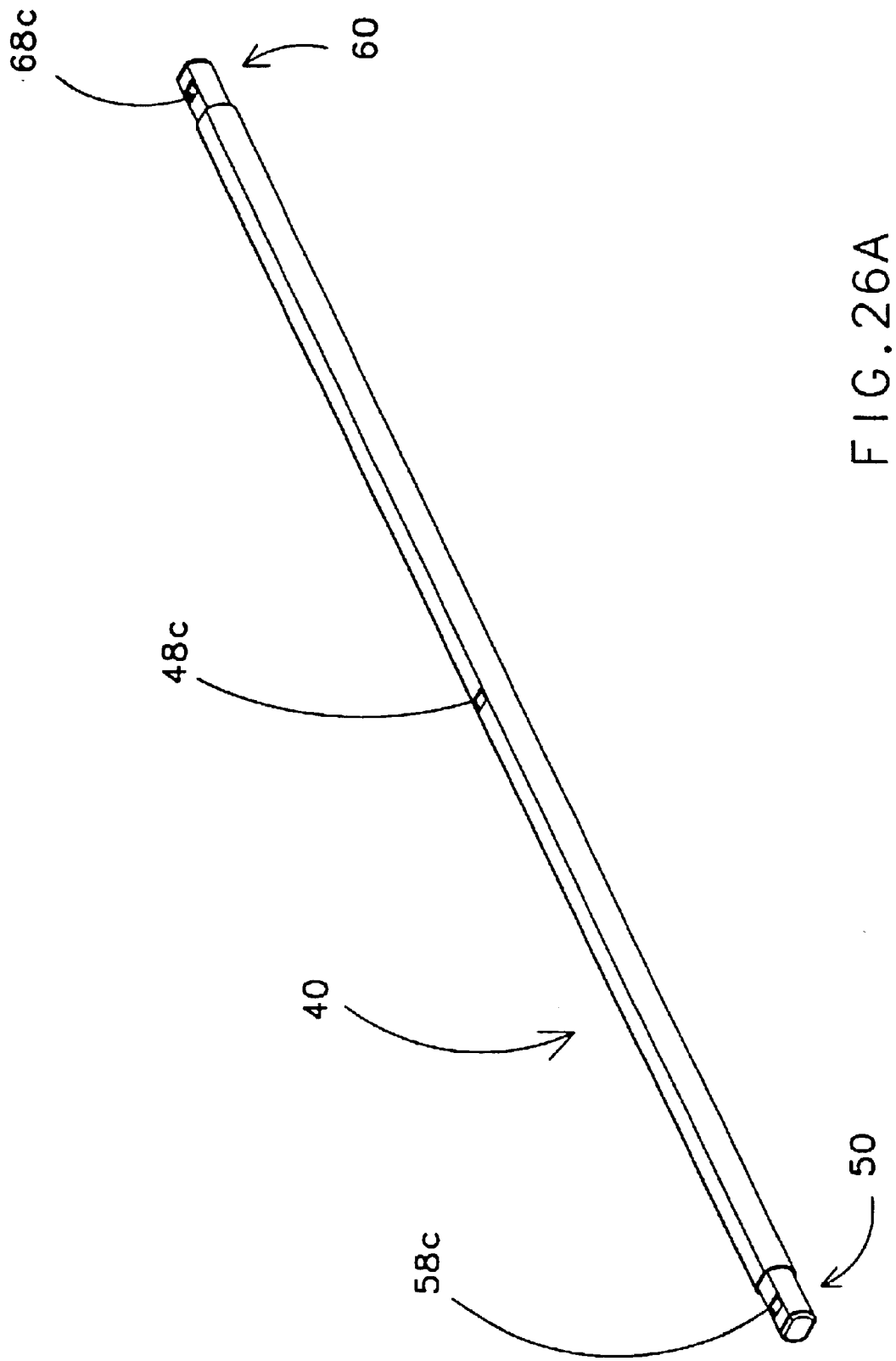

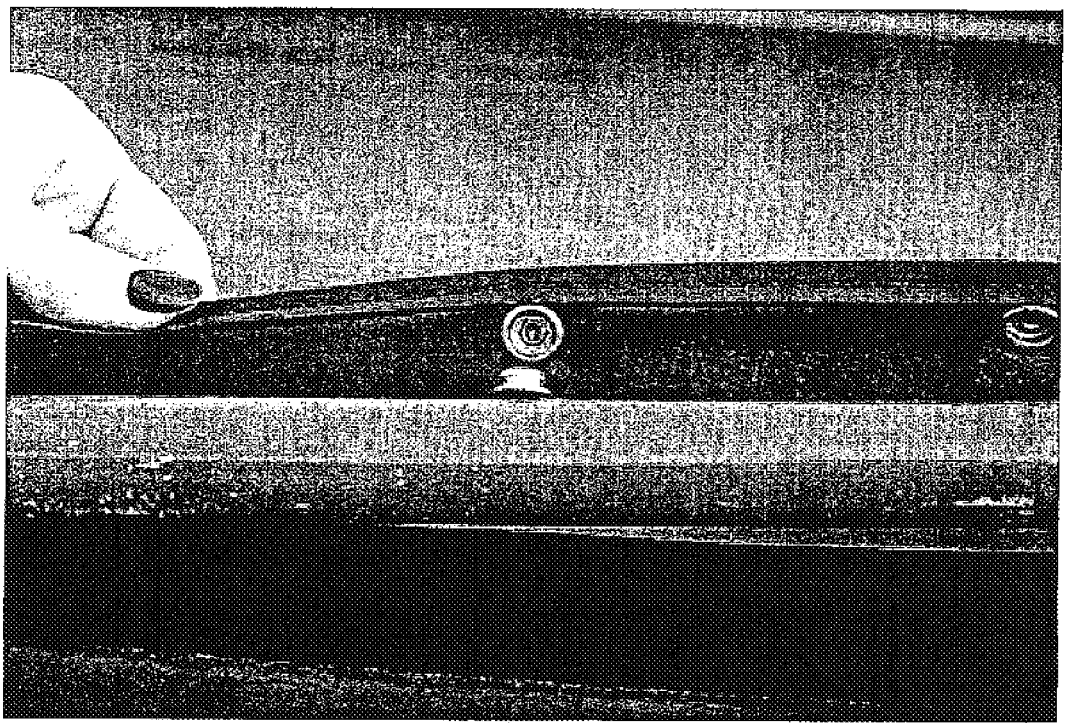
Fig. 35a2

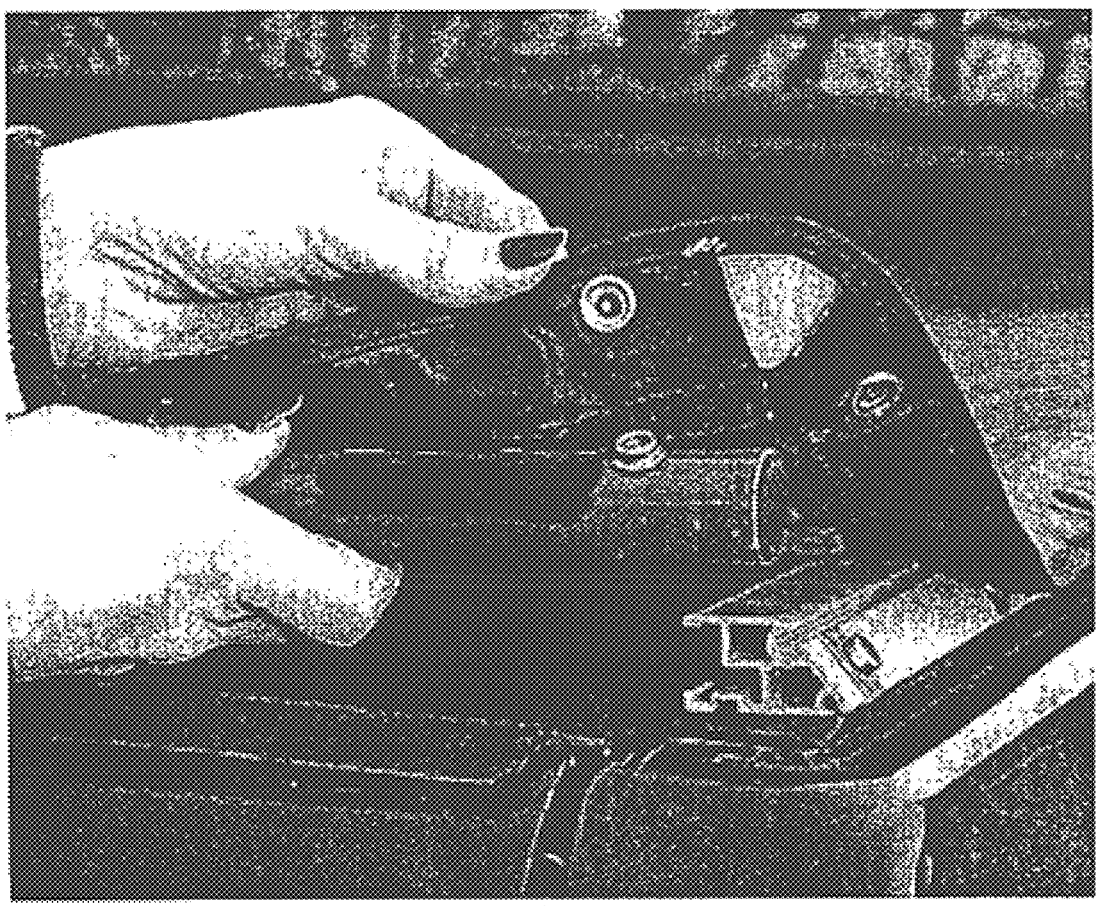
Fig. 35a1

ACCESSORY ATTACHMENT WINDER FOR INSTALLING, REMOVING AND STORING A VEHICLE COVERING

TECHNICAL FIELD

The invention relates to a separate winding or rolling accessory device for installing, removing and storing a cover of a vehicle. The invention also relates to the method of using the device.

BACKGROUND

A cover, such as a tonneau cover, can be positioned to cover a truck or vehicle bed. When the truck bed is needed to transport a large load, the cover can be removed from the bed. Typically, the cover can be removed by folding or sliding the cover from the truck or vehicle bed. The cover can follow tracks, railings, support walls or other extra members to guide or secure a tonneau cover to the truck bed or vehicle enclosure.

SUMMARY

In general, a winding and rolling device or assembly includes a shaft configured to attach to a perimeter attachment member of a tonneau cover along a narrow dimension of the tonneau cover. The shaft can be adjustable in length and can attach to, and move with, a cover of a vehicle. The device can be utilized to attach, wind, install, remove and store the cover, and be used to rewind and reinstall the cover, after which the device can be separated from the cover and stored.

In one aspect, the device includes an adjustable and releasably attachable tonneau winder accessory for use in flowing and suspended interaction with a pickup truck or vehicle tonneau cover having one or more perimeter attachment members, and in complimentary interaction with a selected portion of the perimeter attachment member; for winding, rewinding, supporting, guiding or positioning the tonneau cover, while remaining positioned therewithin. The accessory interacts with and positionally relates to, a pickup truck or walled vehicle bed or storage area. The adjustable and attachable accessory tonneau winder can be provided with a telescopically extensible base assembly having a central portion and at least one slidably communicating subassembly member. The central portion and the at least one slidably communicating subassembly member can be provided as having a lengthwise outer surfacing, and having and defining along the lengthwise outer surfacing at least one respective coupling attachment members for engaging and connecting to a vehicle tonneau cover. The base assembly, and those parts that contain it, can be positionally adjustable and releasably coupleable to a number of preselected perimeter coupling locations which can include the perimeter attachment member of the vehicle tonneau cover.

In another aspect, an accessory floating tonneau winding and guiding device for use in interaction and engagement with a vehicle tonneau cover.

The tonneau cover, with which the device can be used with, can include at least two end perimeters, each of which, in conventional use, can be provided with a plurality or number of coupling members. In certain embodiments, the device can be utilized in interaction and engagement with a number of such coupling members along one of the end perimeters of the cover, depending on the use of the device being selected by the user. The device can be used, for example, for supporting, positioning, and/or placement of the tonneau cover in relation to a walled vehicle storage or bed area.

In another aspect, the accessory floating tonneau winding and guiding device can be provided with a base support member having first and second ends and a lengthwise laterally walled portion therebetween. The device also can be provided with a middle coupling member, being fixedly secured to the lengthwise laterally walled portion, at a positional orientation which is generally equidistant in relation to the first and second ends. The lengthwise laterally walled portion defines a first positioning channel generally proximate in positional orientation to the first end of the base support member, and a second positioning channel which is generally proximate in positional orientation to the second end of the base end.

In another aspect, the device can be provided with a first positionable coupling member, which is slidably and securely installed in the first positioning channel, and a second positionable coupling member, which is slidably and securely installed in the second positioning channel.

In another aspect, a floating tonneau cover guiding and supporting device for use in interaction with a tonneau cover having a number of coupling members, and in interaction with a plurality of such corresponding, respective, coupling members on a perimeter of a tonneau cover, for securing, rolling, guiding, positioning and storing the tonneau cover in relation to a walled vehicle storage or bed area with which the tonneau cover guiding and supporting device also interacts. The tonneau cover guiding and supporting device includes a first base member having first and second ends and a lengthwise laterally walled portion, and has attachment members for biasably and releasably securing a further member to each of the first and second ends. The device also includes a middle coupling member, which is fixedly secured to the lengthwise laterally walled portion of the first base member at a positional orientation which is generally equidistant in relation to the first and second ends of the first base member and a second base member having first and second ends and a lengthwise laterally walled portion, with the first end thereof having members responsive to the attachment member of the first base member for biasably and releasably attaching the second base member to the first base member. A coupling member can be fixedly secured to the lengthwise laterally walled portion of the second base member at a general positional orientation which is proximate to the second end of the second base member. The device also can include a third base member having first and second ends and a lengthwise laterally walled portion, where the first end thereof has members responsive to the attachment members of the first base member for biasably and releasably attaching the third base member to the first base member. A coupling member can be fixedly attached to the lengthwise laterally walled portion of the third base member at a general positional orientation which is proximate to the second end of the third base member. The first end of the second base member can be slidably and biasably attached to the first end of the first base member, and the first end of the third base member is slidably and biasably attached to the second end of the first base member, so that the middle coupling member of the first base member, the coupling member of the second base member and the coupling member of the third base member are each in general axial alignment with one another.

Advantageously, the winding and rolling tonneau device is of simple construction, preferably of one to three main core components, acting as one individual accessory unit, and serving to engage and interact with a vehicle tonneau cover, to accomplish several functional uses with regard to installing, removing, positioning and storing the cover.

In addition, the tonneau cover winder with one or more stationary attachment coupling members, and one or more positionable coupling members make the winding unit, complimentary and responsive to a number of the types of coupling members (for example, various snap and complimentary male-female oriented members) utilized on a number of tonneau covers, as well as the different or variable sizes or dimensions of tonneau covers.

It is also productive and worthwhile to provide the tonneau winding and rolling device as a portable, self-contained unit, which is user-friendly and easy to manually operate, for the purpose of attaching this unit to a tonneau cover of a vehicle, and winding, rewinding, positioning and storing the device, both with, and without the tonneau cover attached thereto, in relation to a walled, hidden or sunken truck or vehicle bed or storage area, or to store then arrangement (winder or winder coupled to tonneau cover) in a separate location apart from a vehicle.

The unitary accessory tonneau cover attachment winder can float, flow, or be suspensionable or can be suspended as it moves with the winding or turning action, carrying the tonneau cover with it while being moved to a preselected location. It is also desirable that, after providing movement to a selected location in relation to a vehicle bed or storage area, the winder be detachable and removable from the tonneau cover, if desired, or stored with or without the tonneau cover at a desired location.

The movable tonneau roller or winder which is installable and can be placed in an axial and lengthwise orientation, across a walled truck bed or like enclosure, and can be positioned more easily between a fore and aft location of the vehicle enclosure.

In addition, the tonneau cover winder and roller can be capable of rolling, and unrolling, a tonneau cover while positioning an end portion or end perimeter of the cover for attachment at a desired location, such as at the end wall of a vehicle bed or near the front wall or cab area of a pickup truck. The device can also be capable of depending on the weight of the tonneau cover itself for stationary positioning when the cover is partially or completely rolled up in relation to the front or back of a truck bed enclosure.

The tonneau cover winder as an accessory unitary device can not use or depend on a spring loaded or biasing members to engage or move a tonneau cover, can not utilize separate or additional tracks, railings, support walls or other extra members to guide or secure a tonneau cover, other than a pre-existing and provided truck bed or vehicle enclosure, to guide and secure the cover, and can not utilize a separate stationary housing and/or support for enclosing and spooling or rolling-up the cover, and limiting the storage location options for the cover.

Other features and advantages of the invention will be apparent from the description and drawings, and from the claims.

DESCRIPTION OF DRAWINGS

FIG. 3A is an enlarged fragmentary or partial elevated perspective view of a winder of FIG. 1.

FIG. 9A is an enlarged partial perspective view of a portion of a winder.

FIGS. 12A–D are enlarged end views of the base member of a winder.

FIG. 13A is an enlarged end view of the base member of a winder of FIG. 13.

FIG. 14 is an enlarged partial perspective view of the slidable and extensible connection of two of the base members of a winder of FIG. 9.

FIG. 16 is a perspective view of another winder.

FIG. 16B is another end view of the middle base member of a winder of FIG. 16.

FIG. 21A is an enlarged partial perspective view of an end portion of a winder of FIG. 20, illustrating two of the base members in a closed or contracted positional orientation in relation to one another.

FIG. 21B is an enlarged partial perspective view of an end portion opposite to that illustrated in FIG. 21A, illustrating two of the base members in a closed positional orientation in relation to one another.

FIG. 24 is a perspective view of another winder.

FIG. 26A is a perspective view of a winder of FIG. 24, illustrating a closed or contracted positional orientation.

DETAILED DESCRIPTION

Figure 1:
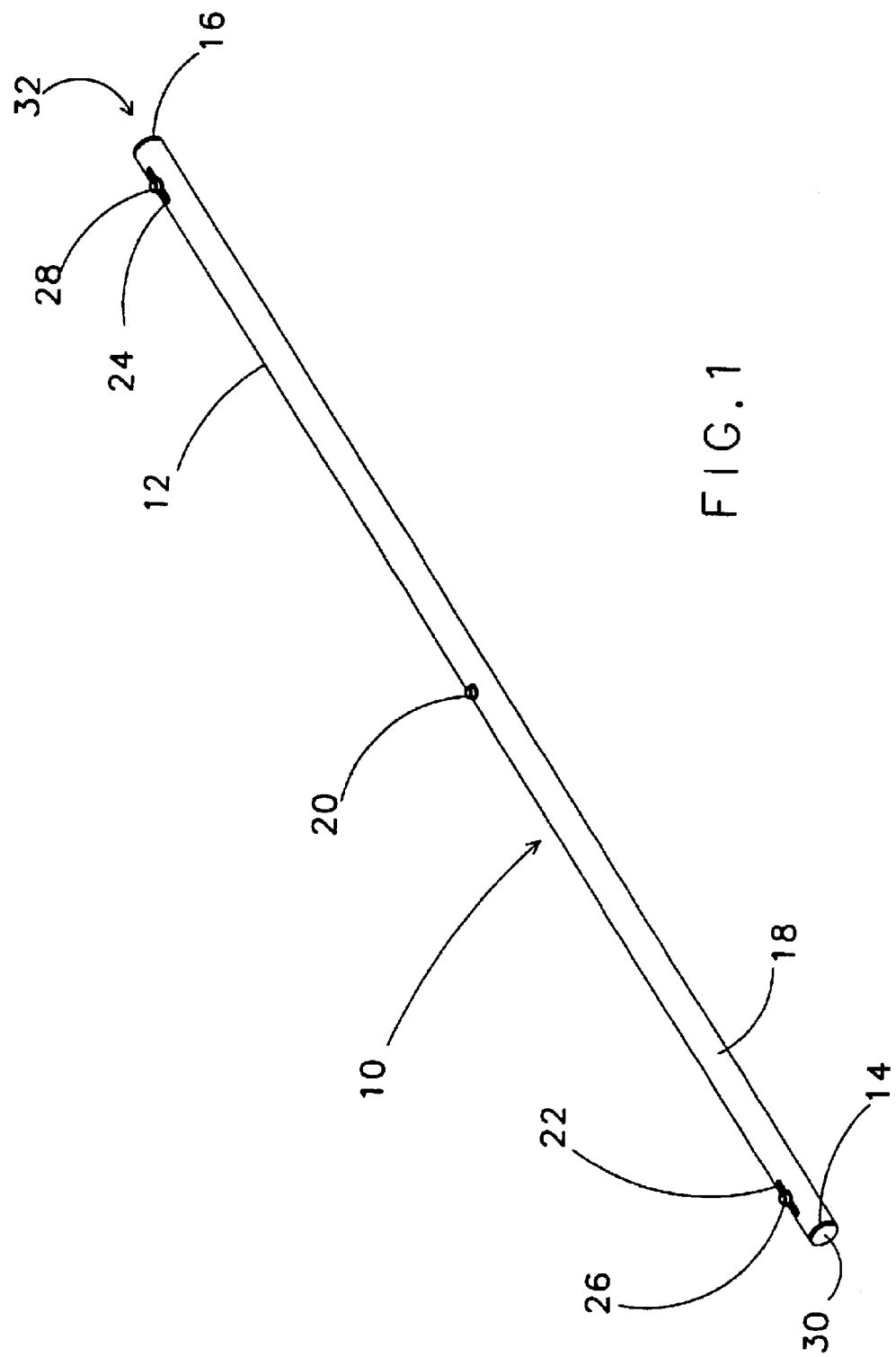
FIG. 1 is an elevated perspective view of an accessory attachment winder for installing, removing and storing a vehicle tonneau and truck bed cover, and like covering.
Figure 2:
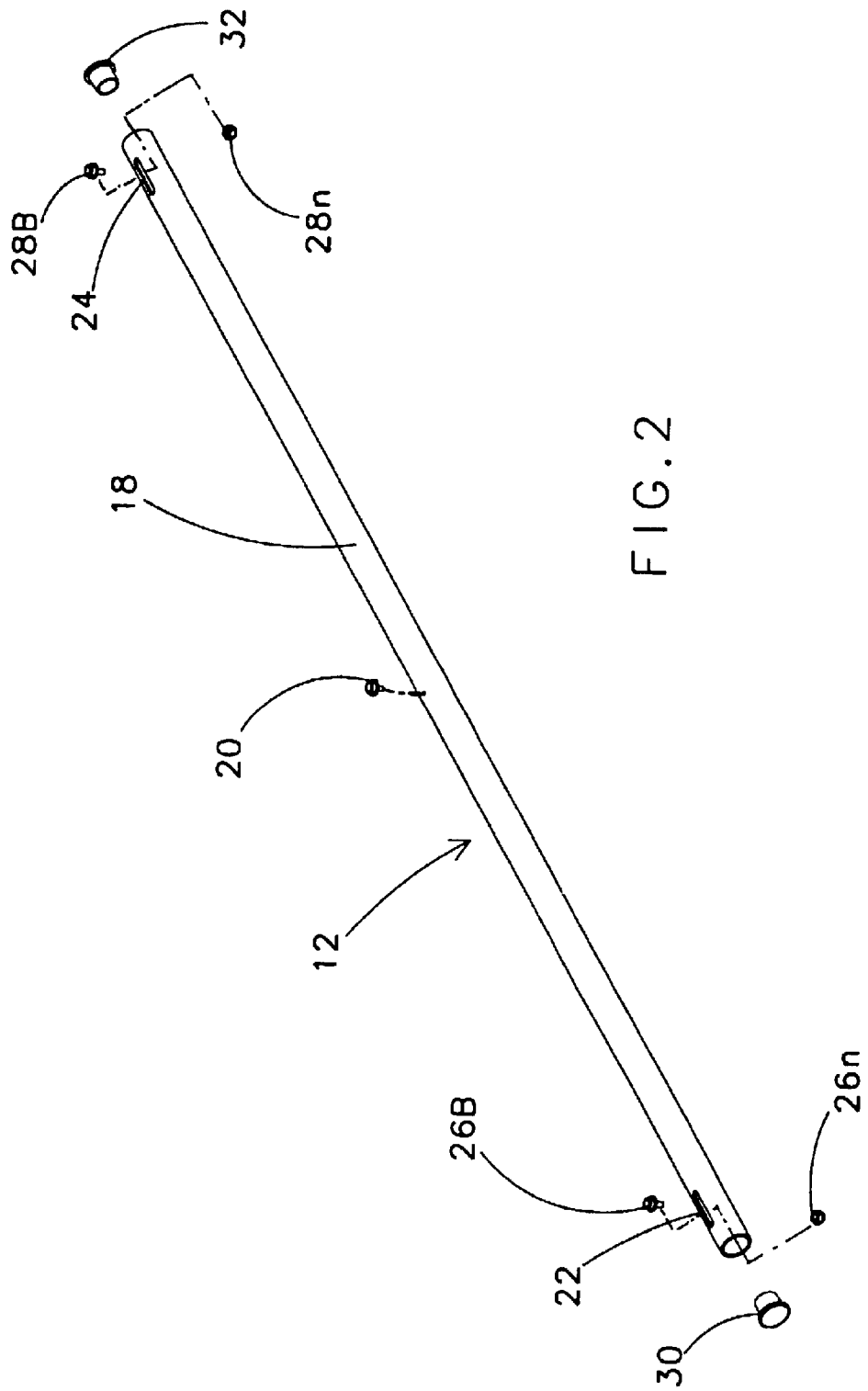
FIG. 2 is a partially exploded perspective view of a winder of FIG. 1.
Figure 3B:
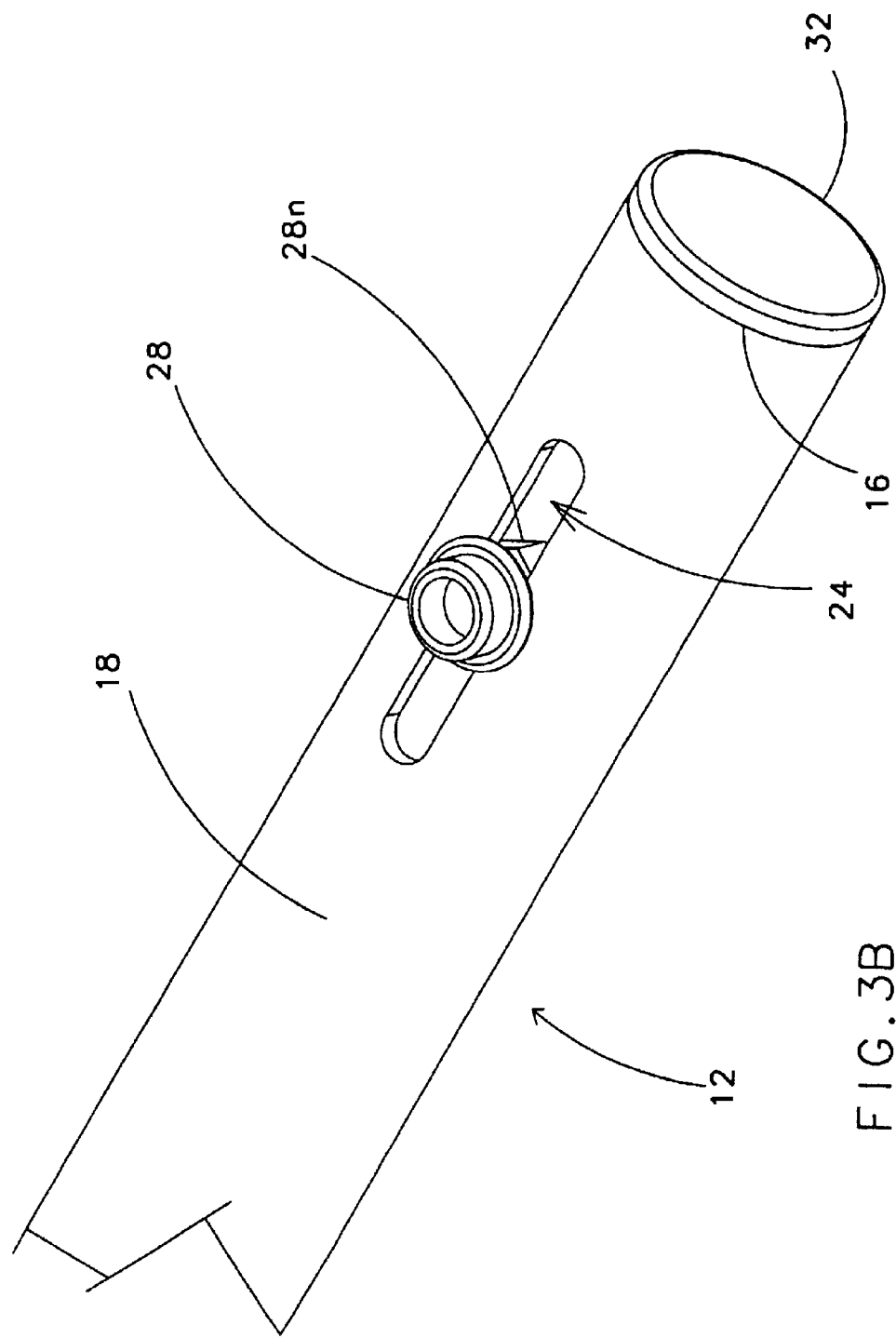
FIG. 3B is another enlarged partial elevated perspective view of a winder of FIG. 1, illustrating the opposing end portion to that of FIG. 3A.
Figure 4:
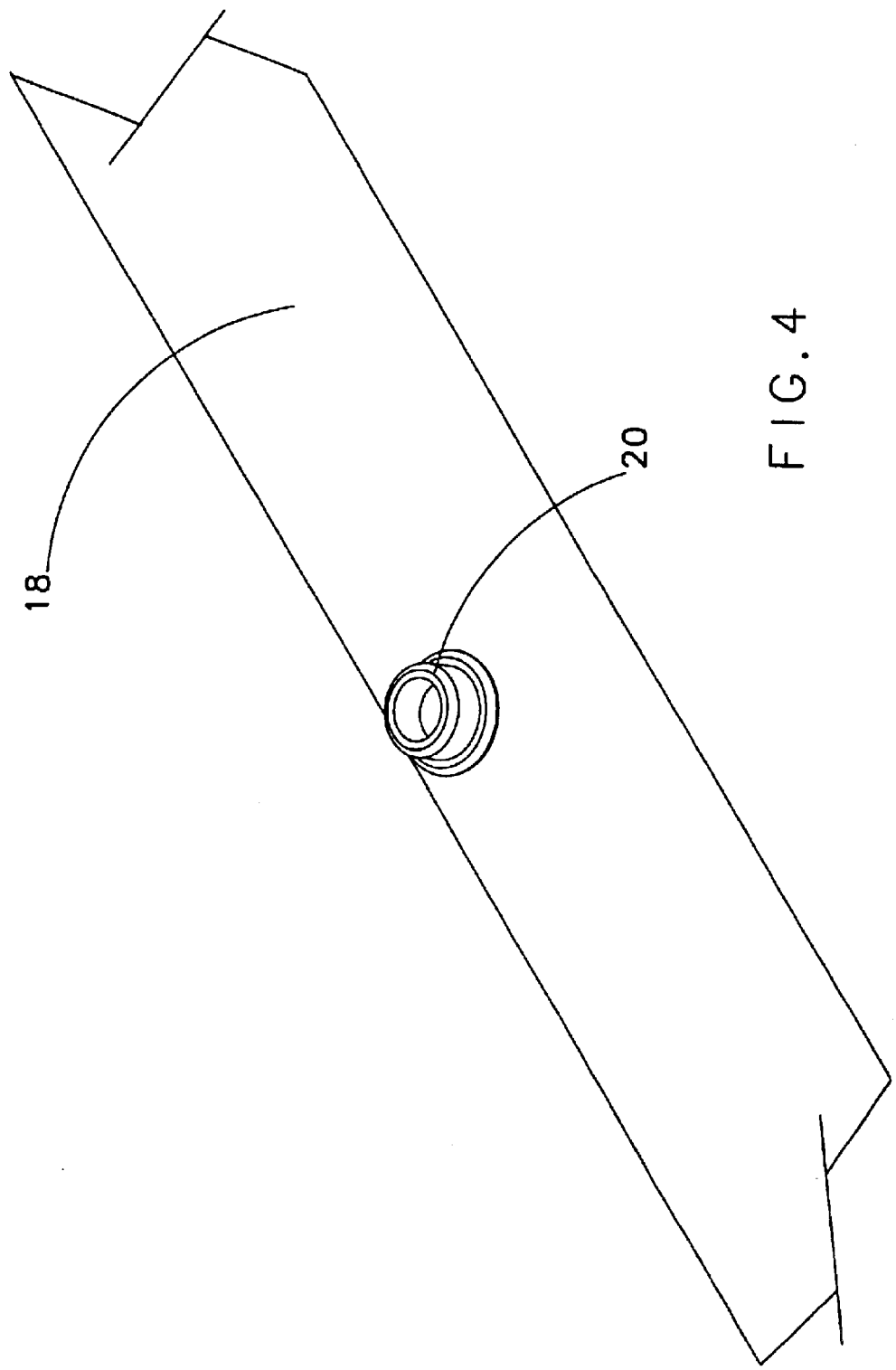
FIG. 4 is an enlarged partial perspective view of the middle portion of a winder of FIG. 1.
Figure 5:
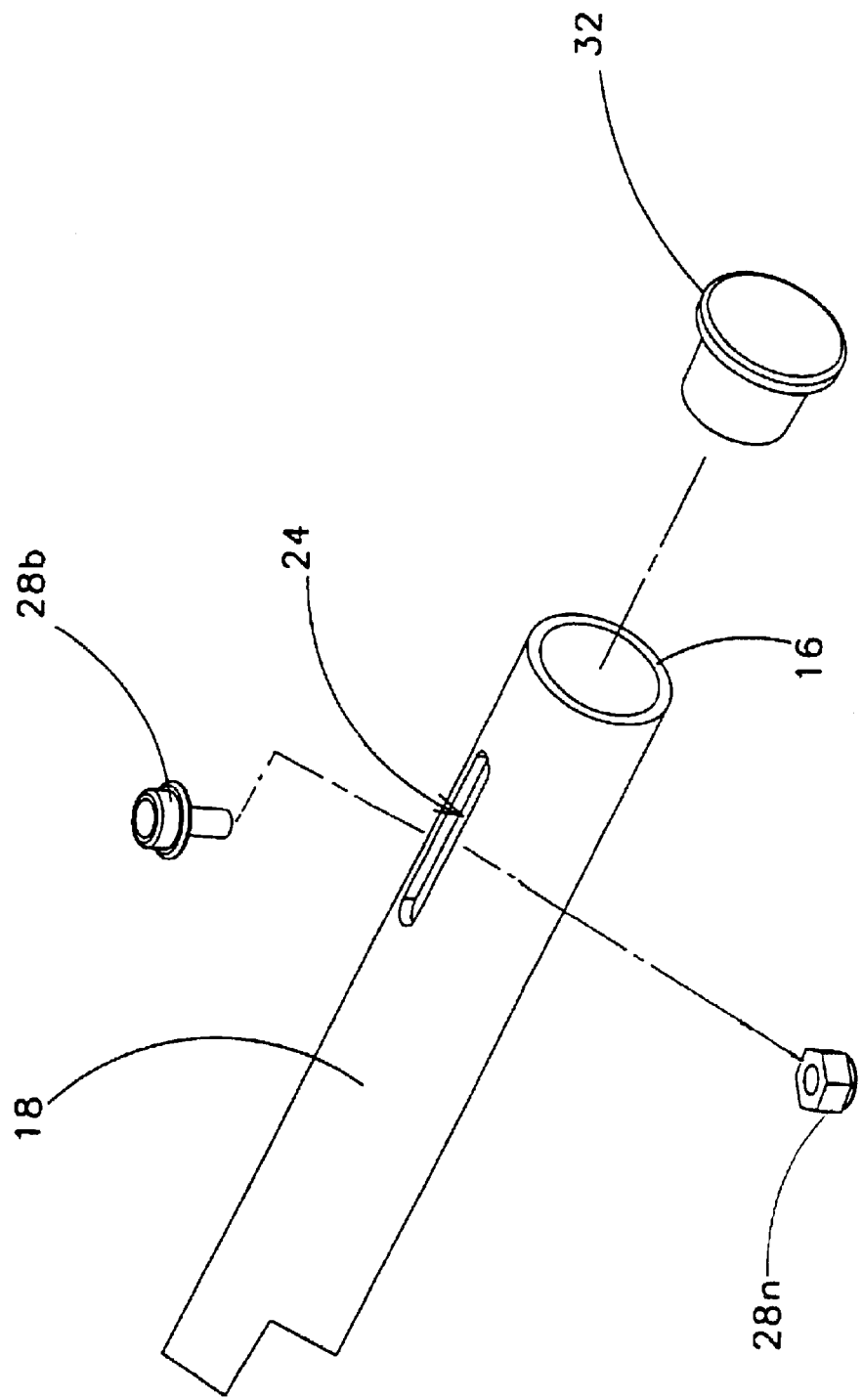
FIG. 5 is an enlarged partially exploded end perspective view of a winder of FIG. 1.
Figure 6:
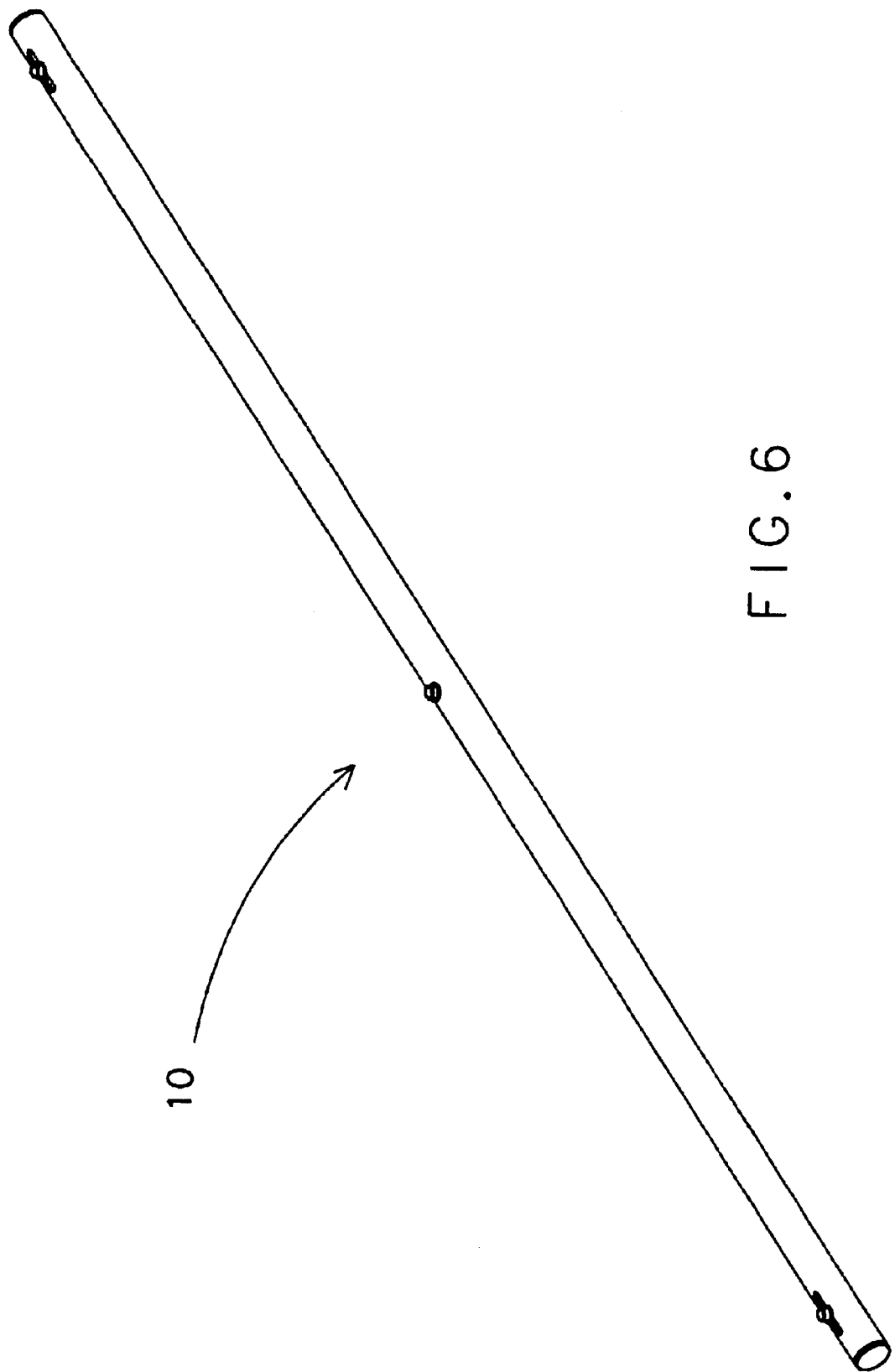
FIG. 6 is a perspective view of a winder of FIG. 1.
Figure 7:
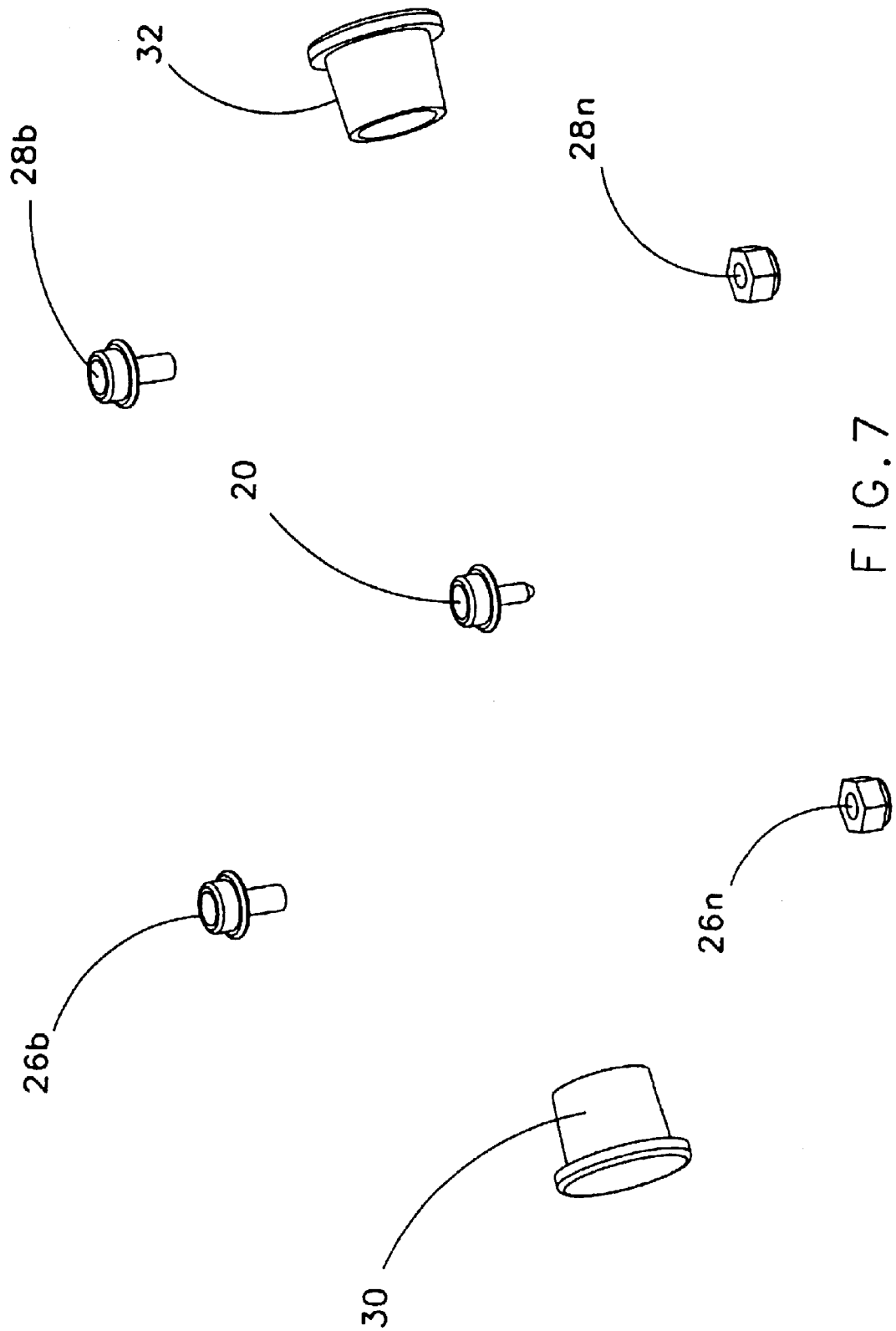
FIG. 7 is a perspective view of connectable element members in a winder of FIG. 1.
Figure 8:
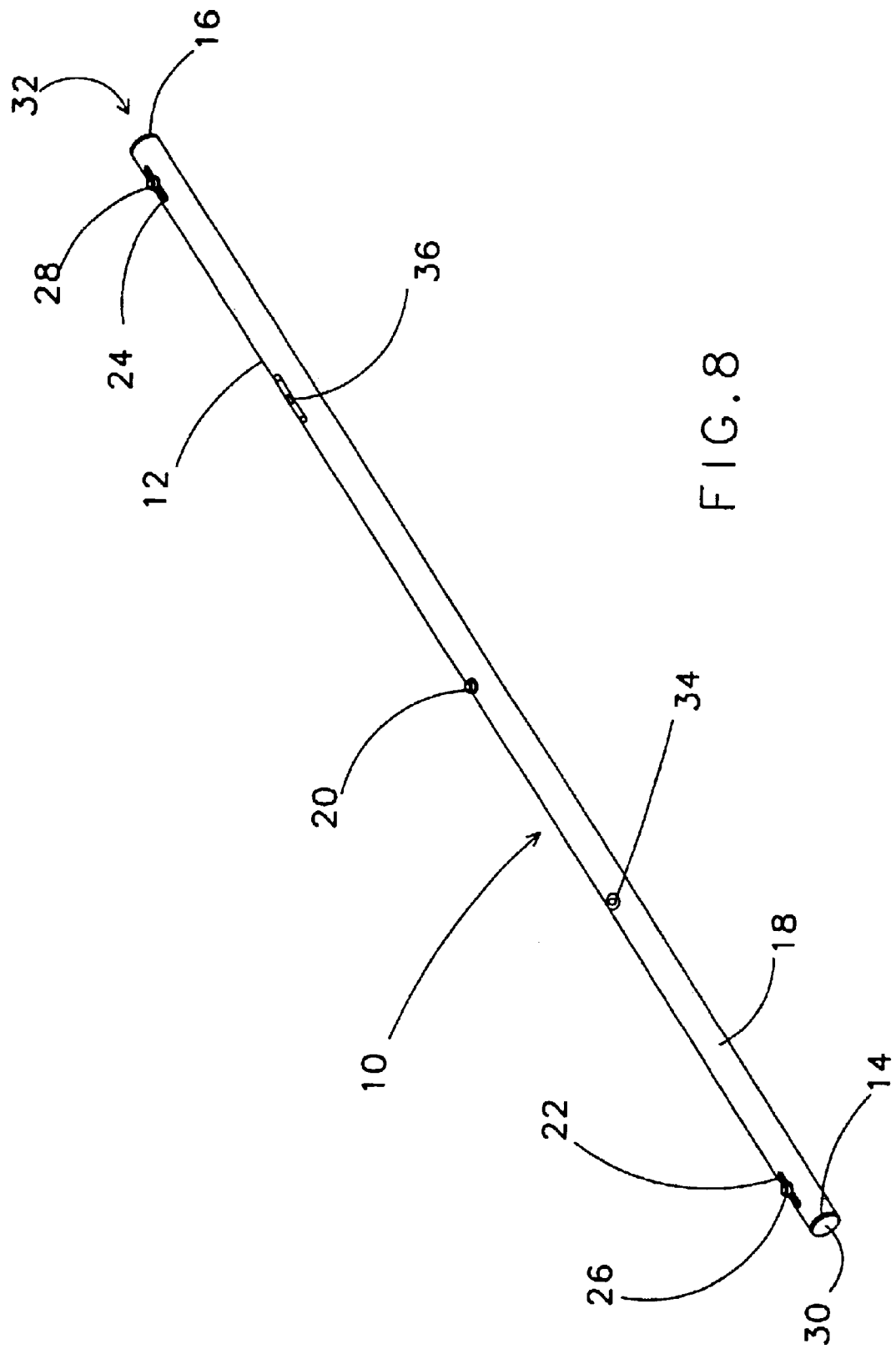
FIG. 8 is a perspective view of another winder.
Figure 9:
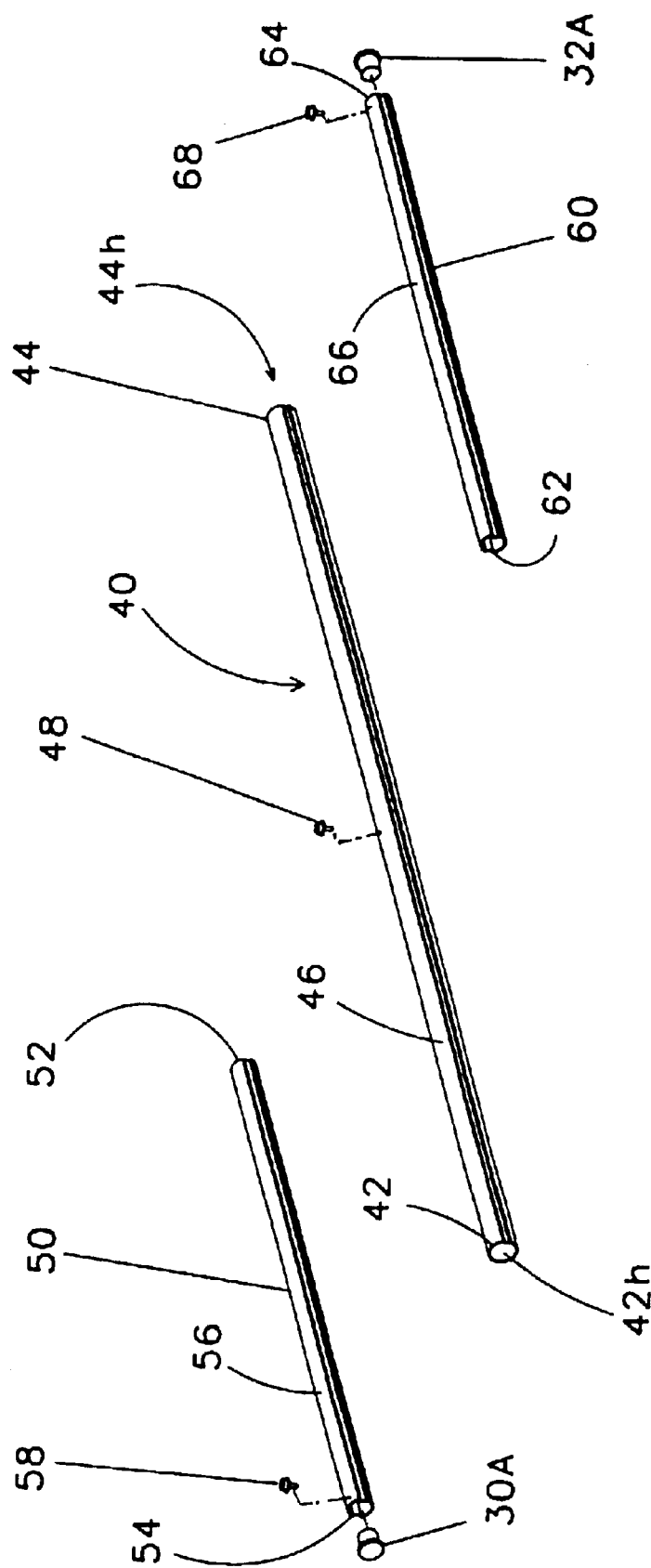
FIG. 9 is another winder, illustrating then embodiment with multiple or plural base assemblies, extensible and slidable within one another.
Figure 10:
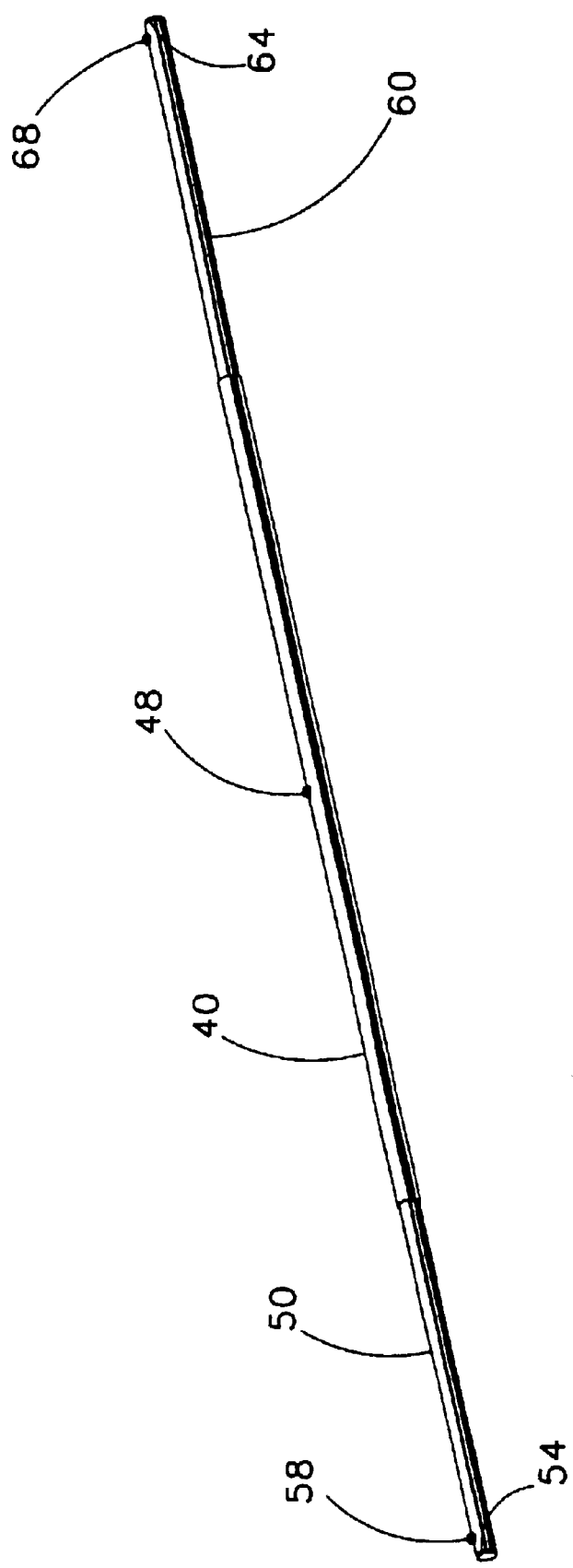
FIG. 10 is another perspective view of a winder of FIG. 9, illustrating a connected and extended positional orientation for installation in interaction with a tonneau or like cover.
Figure 11:
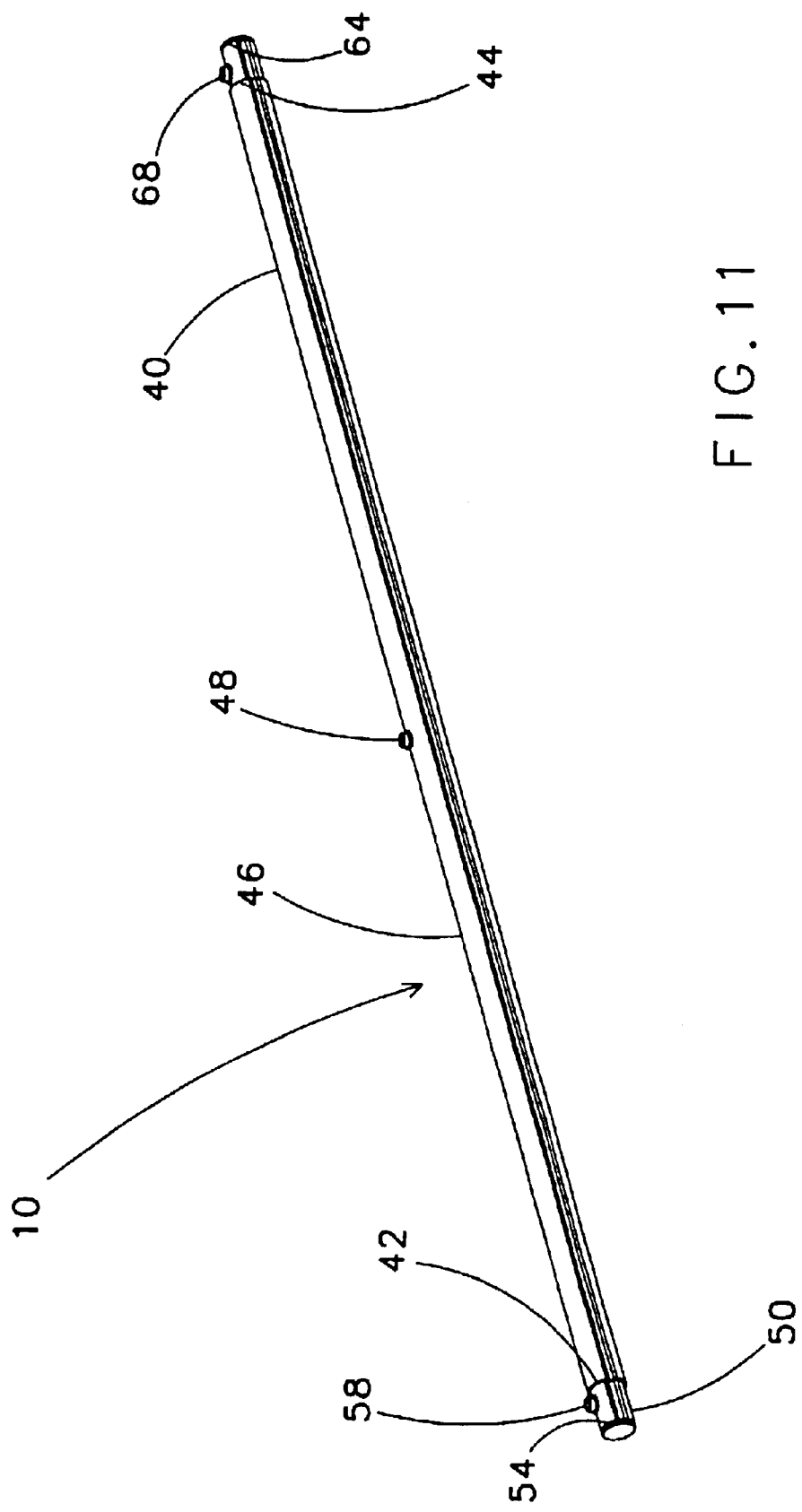
FIG. 11 is a perspective view of a winder of FIG. 9, illustrating a slidably closed or storable positional orientation, or in a positional orientation for connection to a smaller tonneau or other cover.

Referring now to the drawings, FIGS. 1 through 8, there is shown an accessory tonneau attachment 10, referred to herein as the "tonneau accessory" 10, or "accessory" 10.

The tonneau accessory 10 is utilized, in preferred embodiments, in interaction with a tonneau cover (not shown; see, for example, FIG. 35) having at least two end perimeters, where, as is often the case in provided tonneau covers, the cover has at least two end perimeters which each have a multiple number of snap, coupling or other attachment members, located thereon, for securing the cover to a vehicle, such as a pickup truck, walled rear bed area. It will also be understood that many such covers provide at least four perimeters, the front, back, and right and left sides, with the attachment members for securement to a vehicle bed or compartment. The tonneau accessory 10 of the present invention, is therefore, intended to engage and interact with two such perimeters of a tonneau cover for the purpose and use of supporting, positioning and placing the cover in relation to a walled vehicle bed or storage area and/or a walled area and an overhanging beam or rib support which is often utilized in securing such covers in pickup truck beds.

The tonneau accessory 10 is provided with the base support 12 which has the first end 14, the second end 16 and the lengthwise lateral wall 18. The middle coupling member 20 is attached and secured to the lengthwise lateral wall 18, in the middle portion of the wall 18, between the first and second ends 14 and 16. The lateral wall 18 is provided with the first positioning channel 22 at, near or proximal to the first end 14; and the second positioning channel 24 at or proximal to the second end 16. The first positionable coupling 26 can be attached within the channel 22 so that it may slide and position within the channel 22, for utilization in adapting to positional differences or dimensional idiosyncracies of a particular tonneau cover. In like manner, the second positionable coupling 28 is slidably and positionably installed within the channel 24.

The base support 12 and other base support members to be discussed later herein, are preferably constructed or fabricated, configurationally, as a hollow, or partially hollow or in-tunneled, cylindrical tubing member or tubal element; as shown by example in the figures. Additionally, materials for fabrication would include various types of polymer tubing or various metal or light metal alloy materials; as well as wood, polymer wood or fiber glass combinations.

The accessory 10 can also include the end members 30 and 32 which are attached to the respective ends 14 and 16; as optional members and elements to improve durability of the accessory. Additionally, in preferred embodiments, the positioning channels 22 and 24 are fabricated in general axial alignment with one another, and in general alignment with the middle coupling member 20, as illustrated, by example, in the figures.

As indicated above, in part, many of the available tonneau covers provided for use have included as a part of their construction, various positioned coupling or attachment members or members. These members consist of various types of snap members or elements, or male-female structured complimentary coupling orientations, hook and loop (e.g., VELCRO®) fastening components and/or locations, or other or similarly constructed coupling or attachment members. Therefore, the examples utilized in the various figures attached hereto illustrate a reciprocal or corresponding type of snap coupling member in that it is, presently, frequently utilized. However, it will be understood that many types of coupling and/or attachment members and members can be used, and that this diverse use of different types of coupling and attachment members are incorporated herein. The accessory 10 can use these members to be releasably attached to a given tonneau cover for positioning and storing, as discussed herein.

The tonneau cover, or like covering or protective sheet, can be attached integrally to the tonneau accessory 10, such as through attached tonneau flap portions or portions of the tonneau sown, spliced, securely combined or otherwise attached integrally, fixedly or permanently to the accessory 10 of the present invention, so that the accessory 10 can be utilized in combination with a tonneau cover or in substantially, permanently or securely fixed interaction with the cover, so that the accessory 10 travels with and is always utilized in non-releasable attachment with the tonneau cover or like cover or sheet in its use in storage, installation and removal (or non-installation) of the cover in its positional relation to a truck bed, vehicle storage area or like interactional or installation environment. The accessory can be, for example, installed by the user or the cover manufacturer, or the accessory can be configured to fit in a pocket built into the tonneau cover.

Also, in preferred embodiments, as illustrated by example, the additional coupling 34 can be attached to the base support 12 at a positional location generally equidistant or between the first end 14 and the middle coupling 20, and each are fabricated to be positioned in general axial alignment with one another. In like manner, the additional coupling 36 is attached to the base 12 at a positional location generally between the second end 16 and the middle coupling 20. It will be understood that is well within the scope and spirit of the present invention to place additional coupling members in other locations along the base 12, and to attach such respective coupling members as fixed members such as the middle coupling member 20; or within a channel or other configuration for releasable movement and positioning therein, as is the case with regard to the first and second positionable couplings 26 and 28 in relation to the first and second positioning channels 22 and 24, respectively.

Referring now to FIGS. 9 through 16B and FIGS. 20 through 28, the tonneau accessory 10 can be a tonneau cover guiding and supporting device for use in interaction and working engagement with a tonneau cover (not shown) having a multiple number or plurality of snaps, attachments, hook and loop attachments, or other coupling members, and in interaction with a corresponding respective group or number of such coupling members on an end, side or other positionally placed or positionally available perimeter or axis of a tonneau cover. The accessory 10, in this embodiment, is also utilized, interactionally or interactively, for securing, rolling, guiding, positioning and storing the tonneau cover in relation to a walled vehicle storage or bed surface area such as those provided within (or part and parcel of) a pickup truck, station wagon or like vehicle, with which the accessory 10 also interacts.

The accessory 10 in this embodiment is provided with the first base member 40 which has the first and second ends, respectively, 42 and 44; and the lengthwise laterally walled portion 46. The middle coupling 48 is securely (or securedly) fixed and attached to the lengthwise laterally walled portion 46 at a location and position generally equidistant, or between the two, in relation to the first and second ends 42 and 44 of the first base member 40, as illustrated by example, and can also be attached at other locations between the ends 42 and 44.

The accessory 10 is further provided with the second base member 50 which has its first and second ends, respectively, 52 and 54; and its lengthwise laterally walled portion 56. The coupling member 58 is securely fixed or fixedly attached to the lengthwise laterally walled portion 56 at a location or position which is on, adjacent or close to (proximate to) the end 54 of the second base member 50. Also provided is the third base member having the first and second ends, respectively, 62 and 64, and the lengthwise laterally walled portion 66. The coupling member 68 is securely attached to the walled portion 68 of the third base member 60 at a general location or position proximate or close to the end 64 of the base member 60. The couplings 48, 58 and 68 (as well as the chamber coupling members 48c, 58c and 68c, later described herein) can be pivotally or positionally installed as described earlier herein.

The end 52 of the second base member 50 slides into the first end 42 of the first base member40. The end 62 of the third base member 60 slides into the second end 44 of the first base member 40. In this manner, the middle coupling member 48 of the first base member 40, the coupling member 58 of the second base member 50 and the coupling member 68 of the third base member 60 are, each placed in general axial position and alignment with each other, where each of them is oriented in axial line (or alignment), one with the other; as illustrated, by example in FIGS. 9, 10, 11, 14, 15, 21, 22, 24, 25, 26, 21A, 21B, 27, 28 and other figure illustrations herein. Other positional orientations can result and be utilized during installation of multiple connecting or extensible base members. Optionally, set screws or pins 49a, 49b, 49c and 49d can be present to hold base members in position (see FIG. 9A).

The first end 42 of the first base member 40 defines and has an installation channel 42h, and the second end 44 has and defines the installation channel 44h. The first end 52 of the second base member 50 is appropriately and accordingly dimensioned so that it will slide and fit within the installation channel 42h of the first end 42 of the first base member 40. And in like manner, the end 62 of the third base member 60 is dimensioned to slidably fit with the installation channel 44h of the second end 44 of the first base member 40.

In preferred embodiments, the first base member 40 is provided with an attachment member as a part of structure for securing a further structural member to each of the first and second ends 42 and 44 so that these members are biased as they are inserted, and remain stiffly resilient as the accessory 10 is being utilized, while also being releasable from within the respective ends 42 and 44. In corresponding manner the second base member 50 is provided with structural members which are responsive to the attachment members of the first base member 40, for biasable, resilient and detachable or releasable attachment and coupling of the second base member 50 to the first base 40; and in like manner, the third base member 60 is provided with structural members which are responsive to the attachment members of the first base member 40, for similar biasable and detachable coupling of the third base members 60 to the first base 40.

With regard to the attachment members of the first base 40, in preferred embodiments, the first end 42 of the first base 40 is provided with the dimple projection member 72 which structurally extends from the lengthwise laterally walled portion 46 into the installation channel 42h; and the second end 44 of the first base 40 is provided with the dimple projection 74 which extends from the lengthwise laterally walled portion 46 into the installation channel 44h.

With regard to the structural members of the second base 50 which are responsive to the attachment members of the first base member 40, for biasable, resilient and detachable or releasable attachment and coupling of the second base member 50 to the first base 40; the lengthwise laterally walled portion 56 is provided with the first projection channel 76. The channel 76 is generally transverse (or positionally set or oriented approximately at 90 degrees) in relation to the axial alignment or position of the coupling member 58 of the end 54. In like manner, with regard to the members of the third base 60 which are responsive to the attachment members of the first base 40, for biasable and releasable attachment of the third base 60 to the first base 40; the laterally walled portion 66 is provided with the first projection channel 78, being generally transverse in position to the position and alignment of the coupling member 68.

Figure 12:
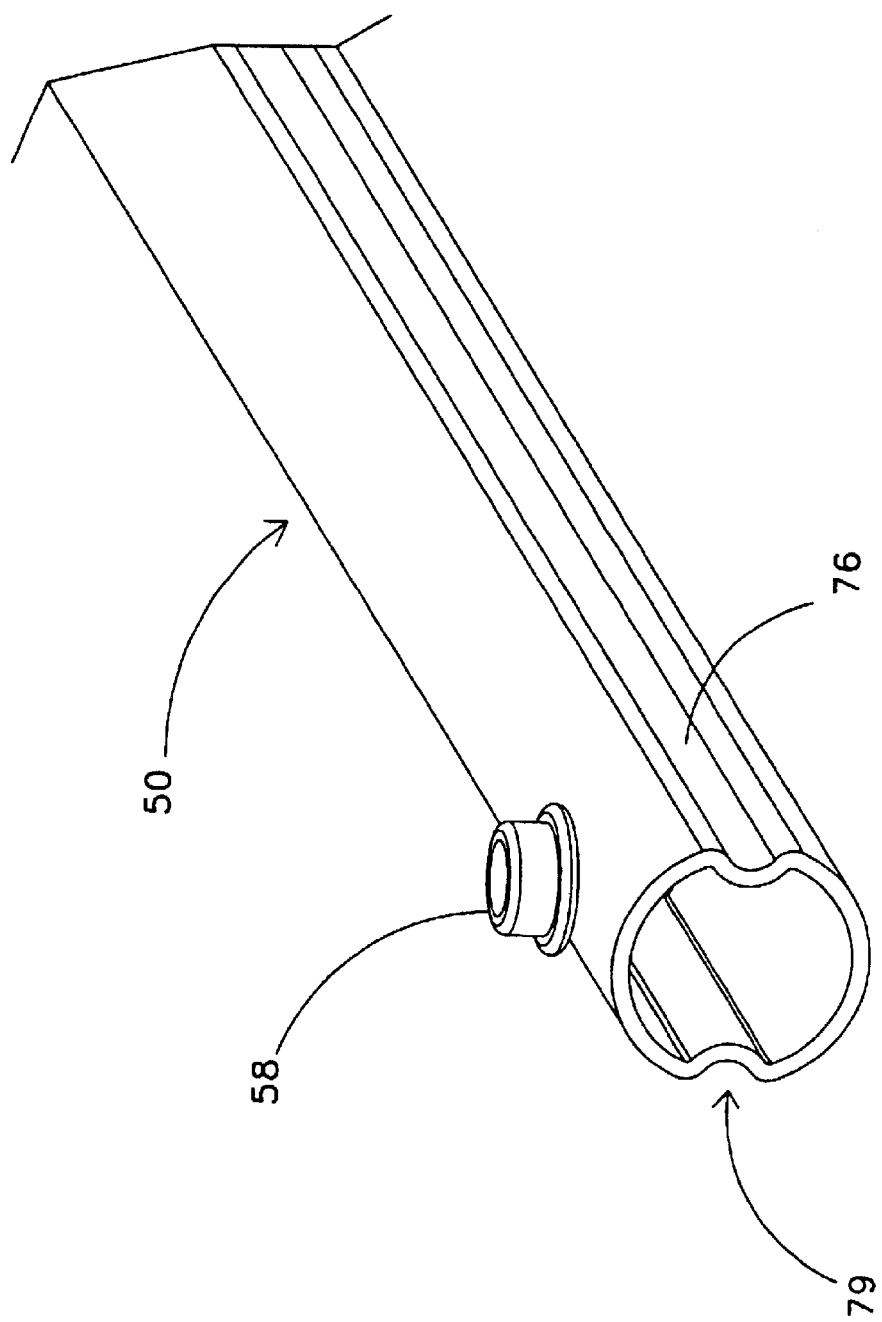
FIG. 12 is an enlarged partial perspective view of an end portion of one of the base members of a winder of FIG. 9.
Figure 12D:
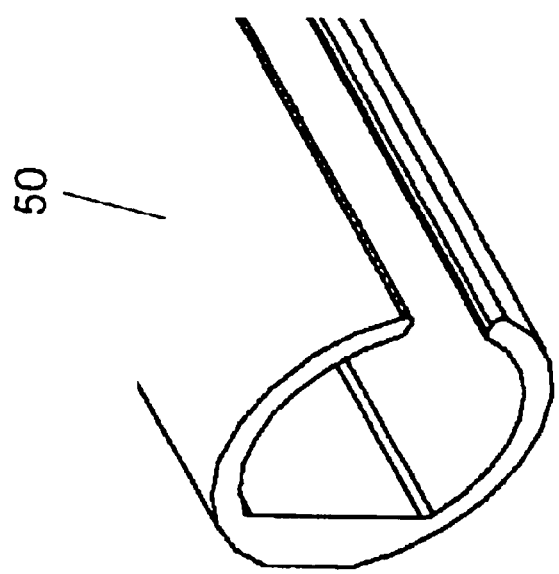
Figure 12C:
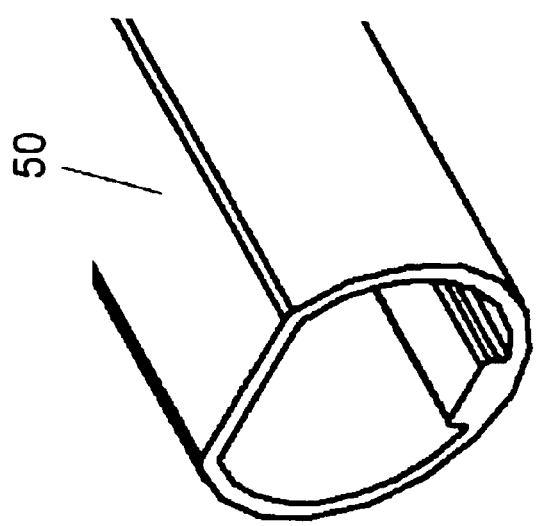
Figure 12B:
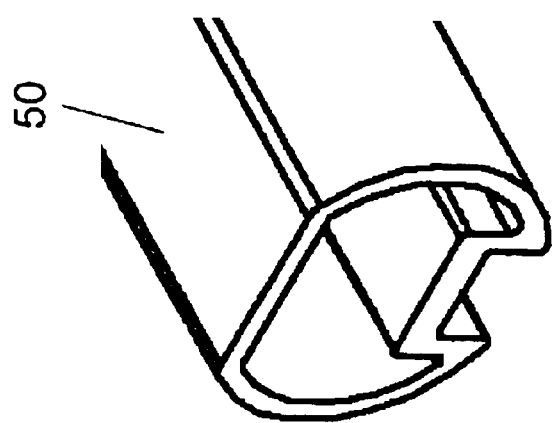
Figure 13:
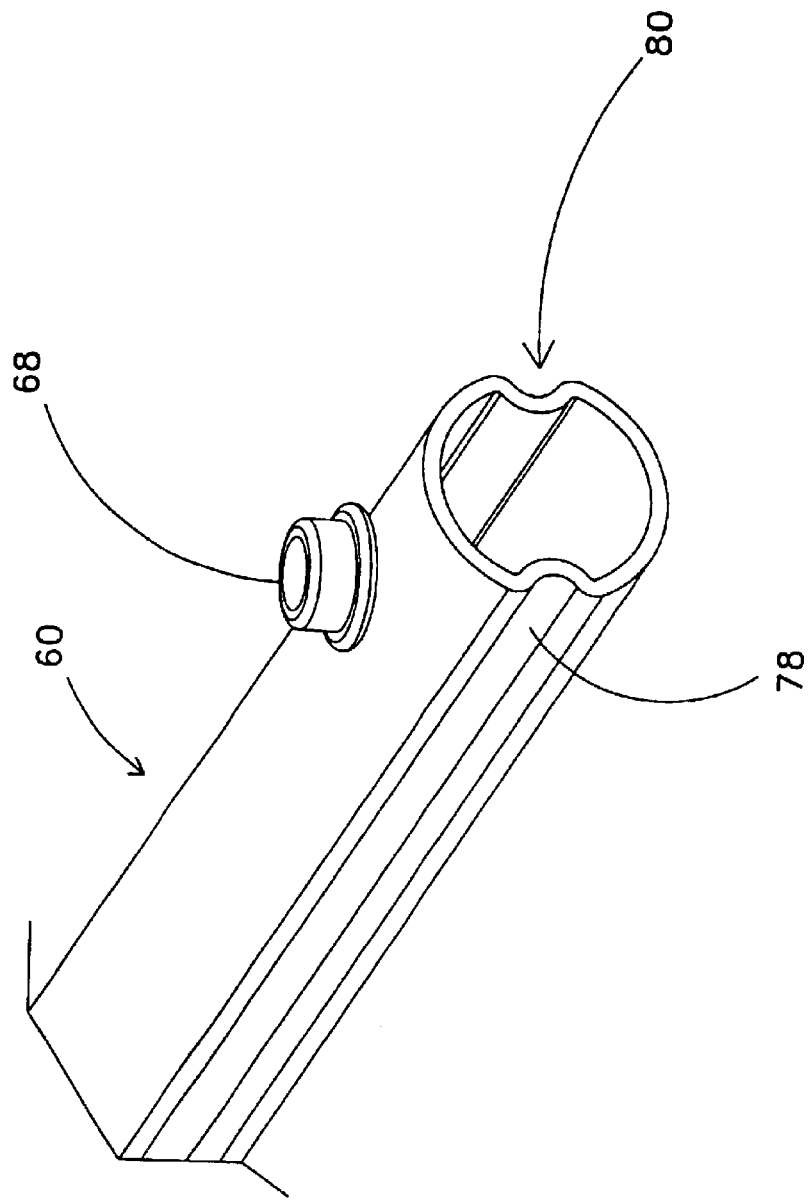
FIG. 13 is an enlarged partial perspective view of an end portion of another base member or section of a winder of FIG. 9.
Figure 15:
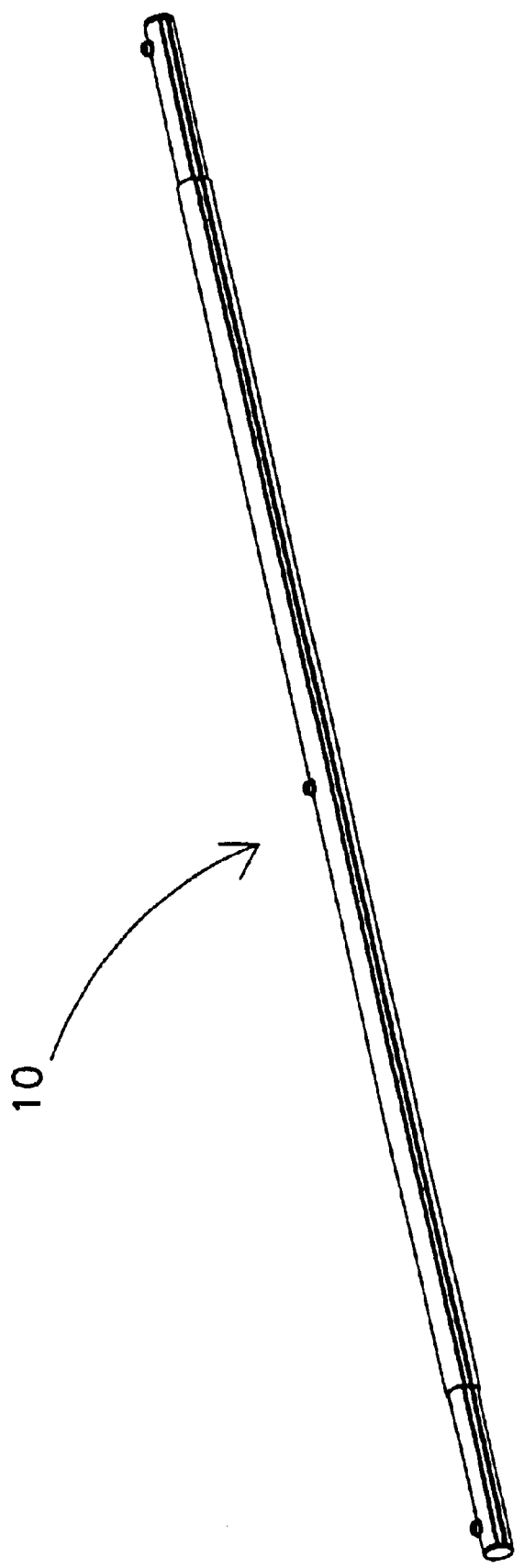
FIG. 15 is a perspective view of a winder of FIG. 9, illustrating another positional orientation for installation in interaction with a tonneau cover.
Figure 16A:
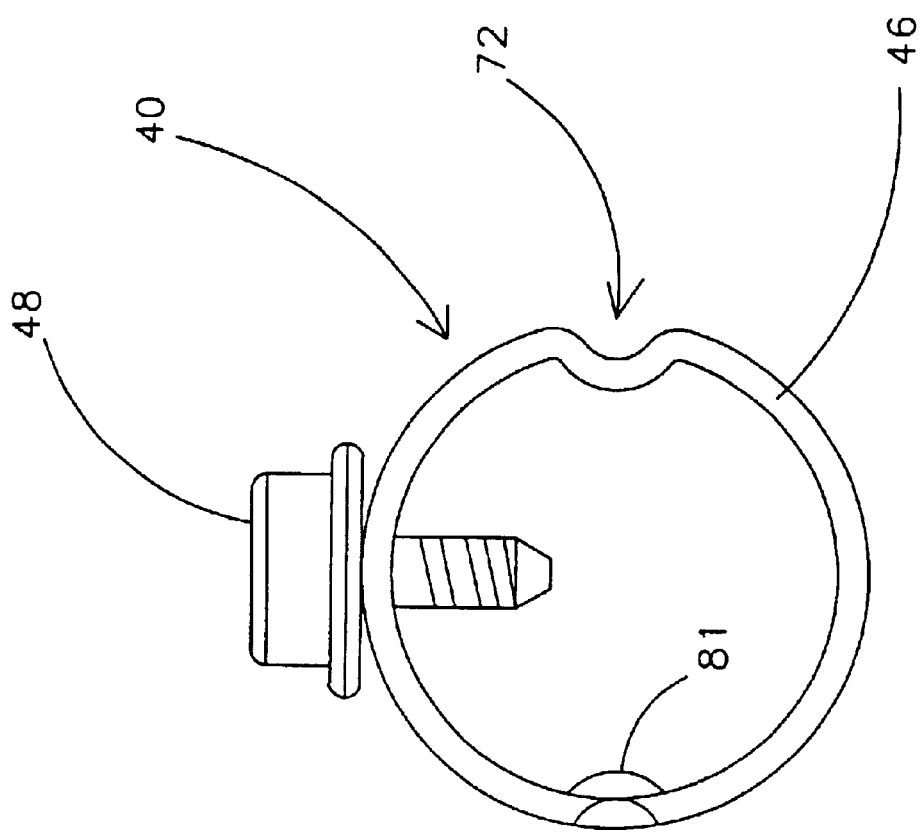
FIG. 16A is an end view of the middle base member of a winder of FIG. 16.

In further related preferred embodiments, the laterally walled portion 56 at or near the end 52 of the second base 50 is provided with the second projection channel 79, generally positioned transversely in relation to the general axial alignment of the coupling member 58 at or near the end 54, and across and opposite from the first projection channel 76, as illustrated, by example. This constitutes, in these related embodiments, further elements of construction of the members of the second base 50 responsive to the attachment members of the first base member 40 for biasably and releasably attaching the second base 50 to the first base 40. In like manner, the laterally walled portion 66 at or near the end 62 of the third base 60 is provided with the second projection channel 80 which is, also, generally positioned transversely in relation to the general axial alignment of the coupling member 68 at or near the end 64, and across and opposite from the first projection channel 78, thus forming further elements of the members of the third base 60. As shown in FIGS. 12B–12D, base 50 can have a variety of cross-sections, provided that the cross-section complements the adjoining bases. The cross-sections can include a tongue and groove arrangement or a "c" shaped arrangement.

Additionally, in further related embodiments of the tonneau accessory 10, the attachment members of the first base member 40 further includes a structure where the lengthwise laterally walled portion 46 at or near the first end 42 of the first base 40 is further provided with the projection rail member 81 which extends within the installation channel 42h of the first end 42, and is placed in a position which is opposite and spaced in relation to, and across from, the dimple projection member 72 of the first end 42; as illustrated by example. In like manner, the laterally walled portion 46 at or near the second end 44 of the first base 40 is further provided with the rail projection member 82 which extends within the installation channel 44h of the second end 44 and is placed in a position which is opposite, spaced and adjacent and across from the dimple projection member 74.

Figure 24B:
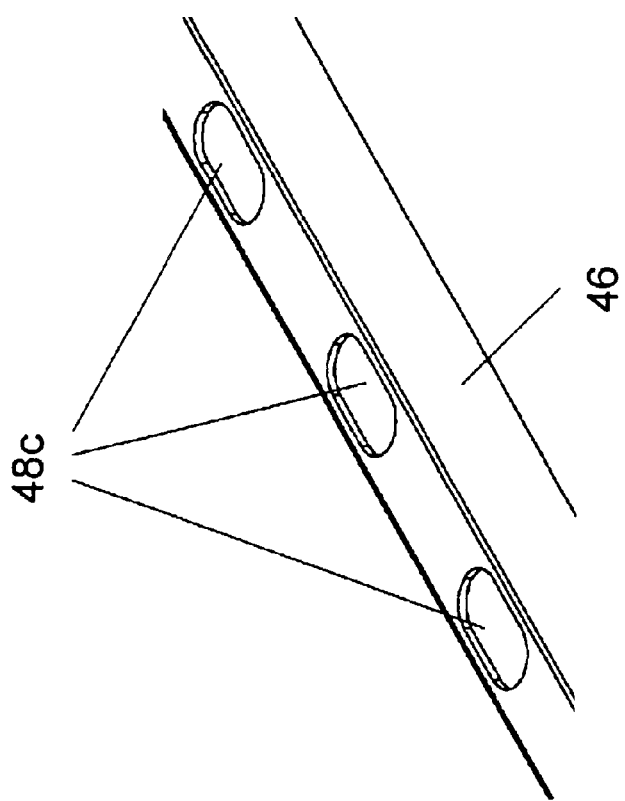
FIG. 24B is an enlarged view of a second side of a base opposite the view in FIG. 24A.
Figure 24A:
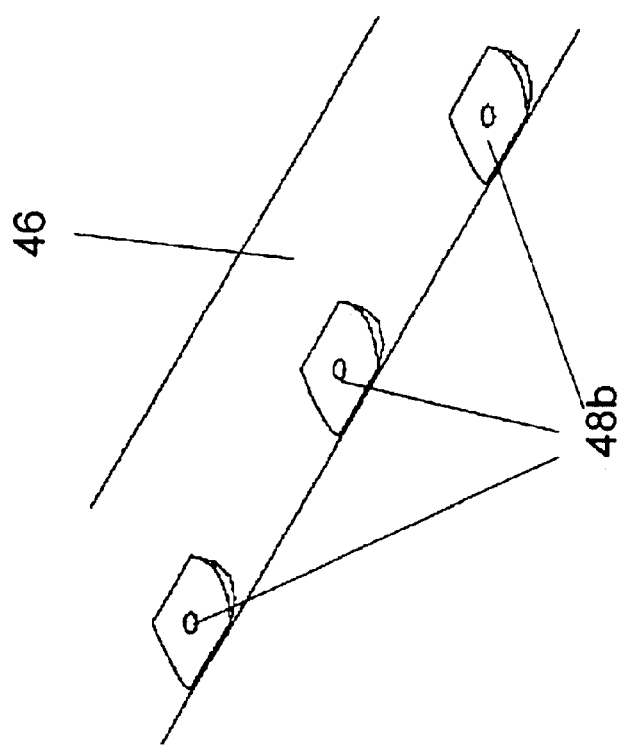
FIG. 24A is an enlarged view of a first side of a base.
Figure 25:
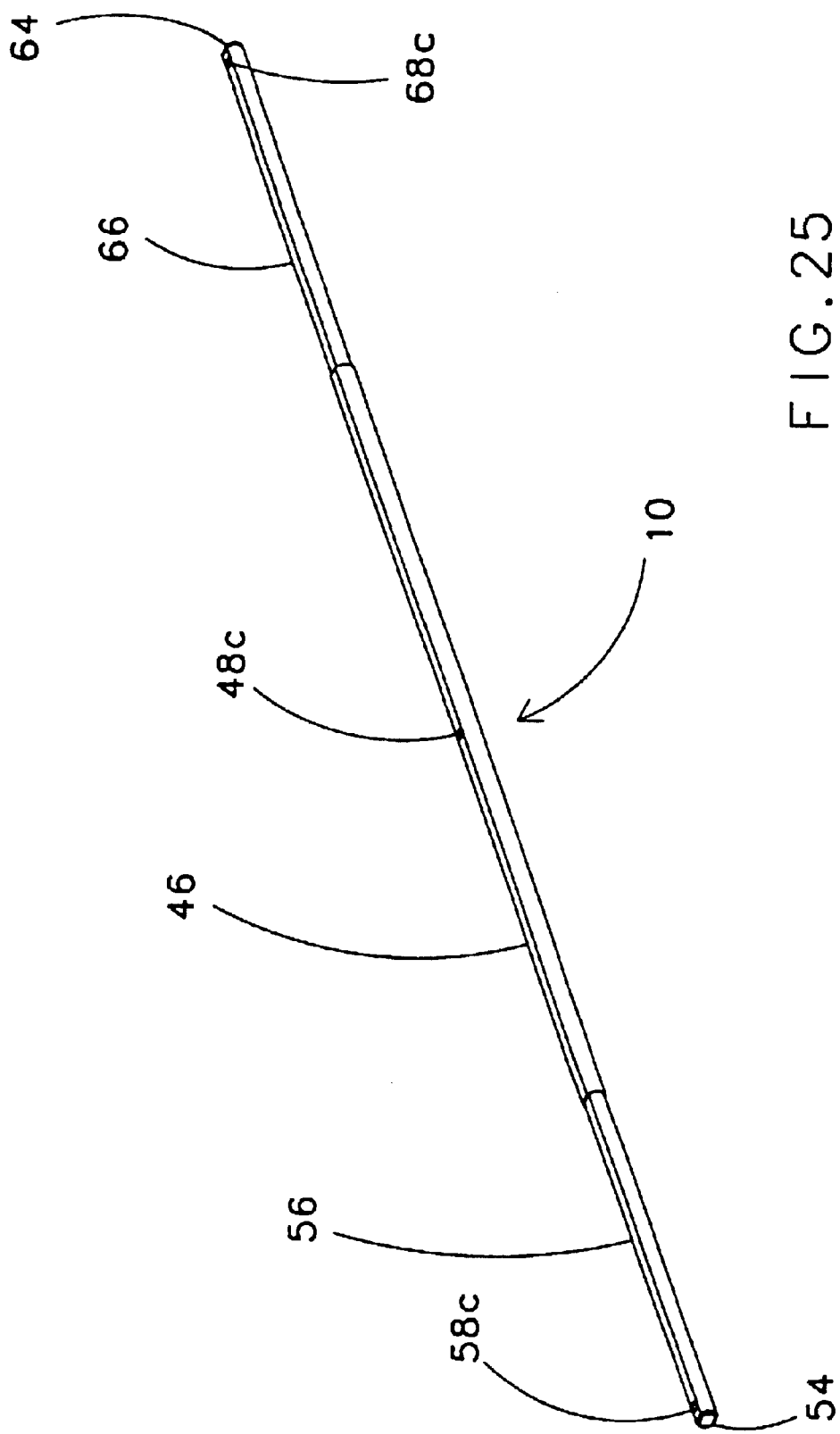
FIG. 25 is a perspective view of a winder of FIG. 24, illustrating an extended positional orientation for installation.
Figure 26B:
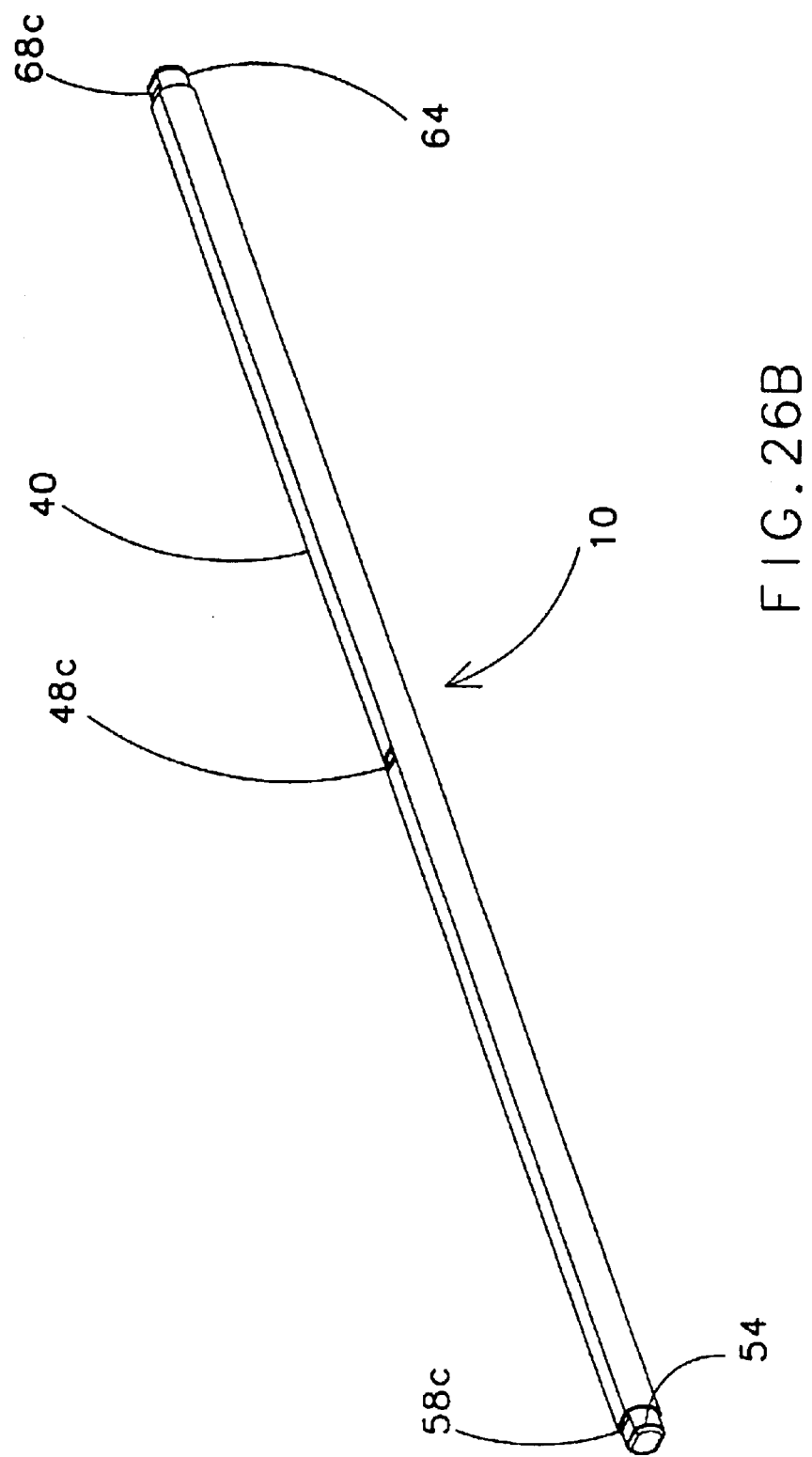
FIG. 26B is another perspective view of a winder of FIG. 24, illustrating another closed or contracted positional orientation.
Figure 27:
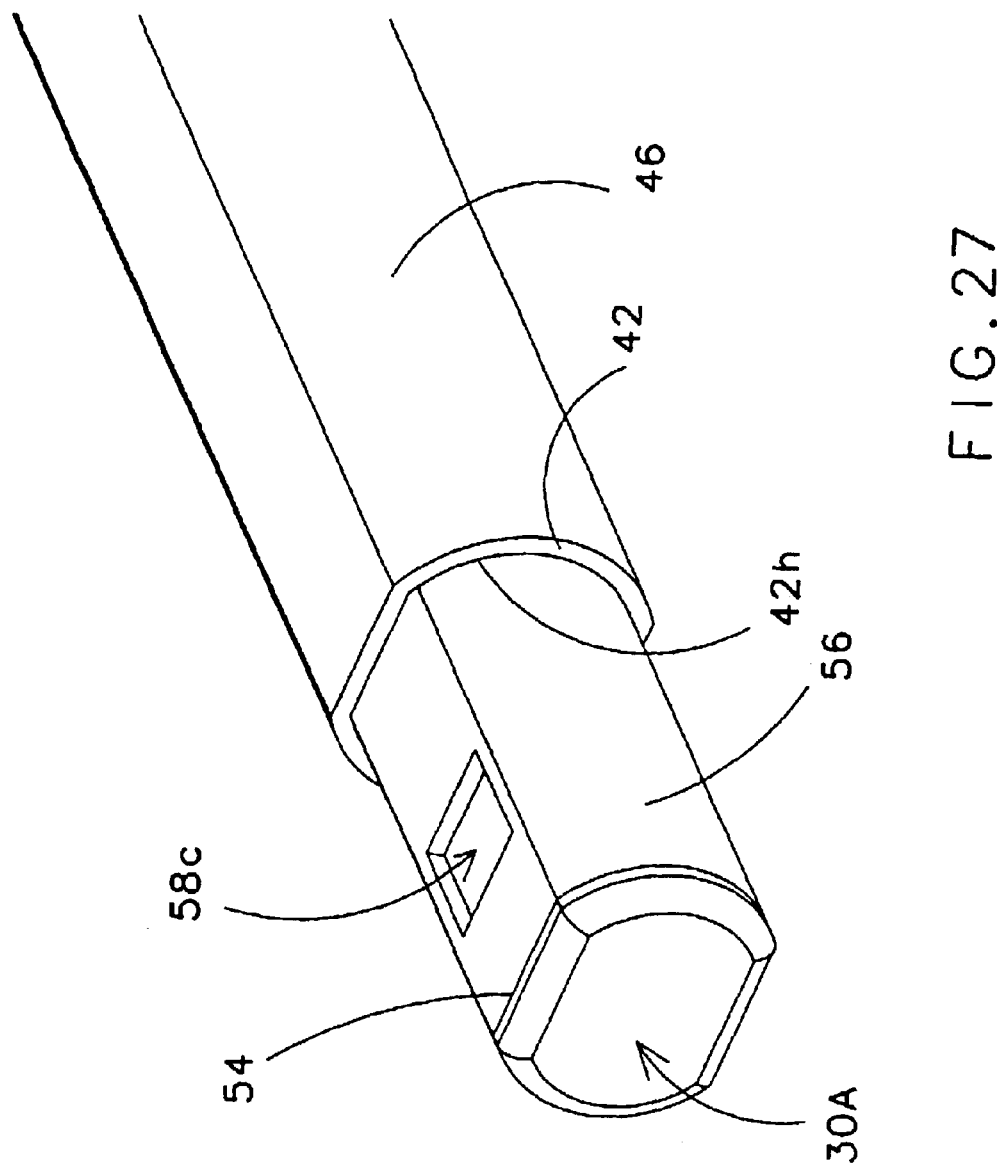
FIG. 27 is an enlarged partial perspective view of an end portion of a winder of FIG. 24.
Figure 28:
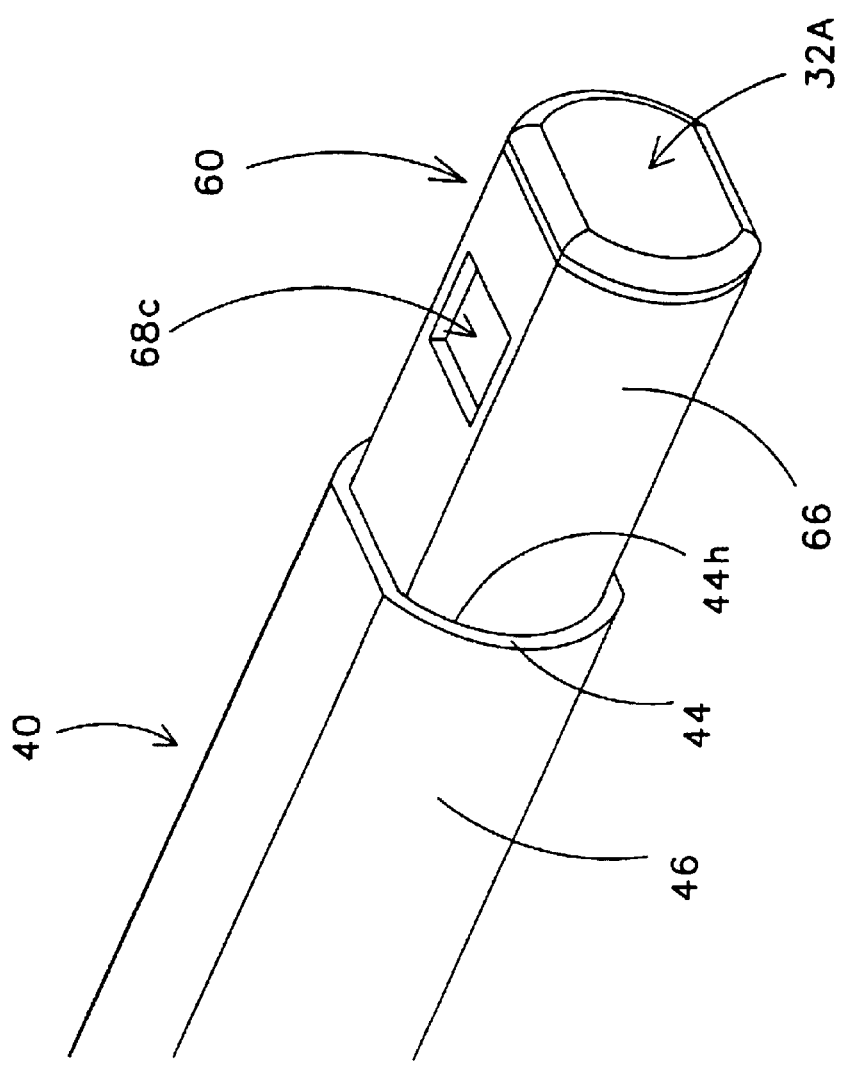
FIG. 28 is an enlarged partial perspective view of an end portion, opposite to that of FIG. 27.
Figure 29:
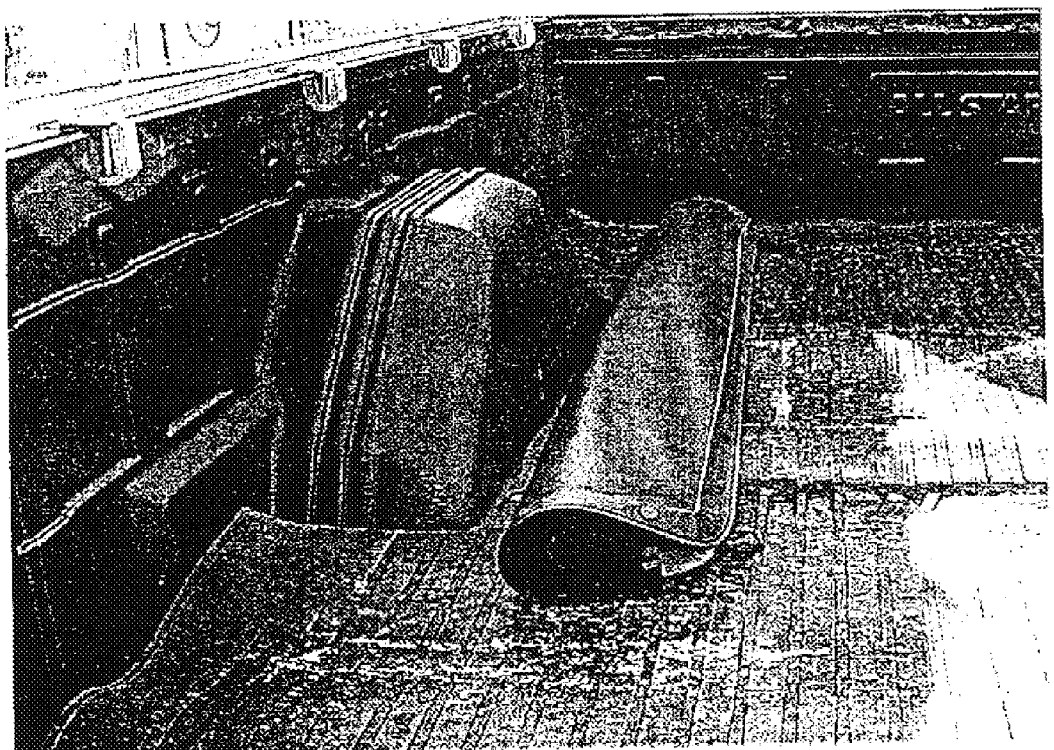
FIG. 29 is an illustration of part of a conventional pickup truck bed, illustrating a part of a method of using the winder, the winder being wrapped in interaction within a tonneau cover, the winder and attached Tonneau Cover being stored in a truck bed.
Figure 30:
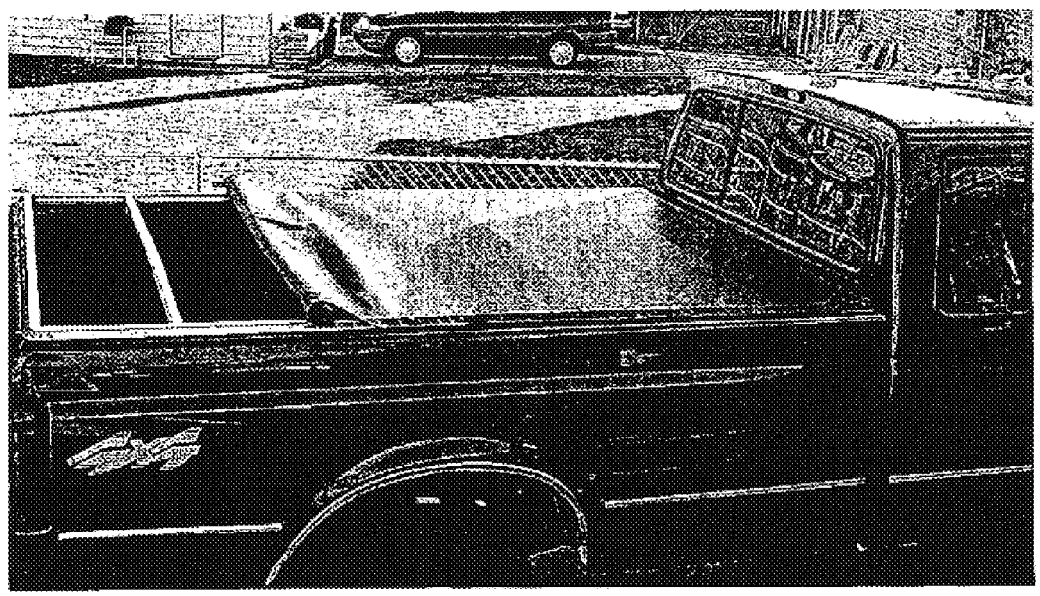
FIGS. 30 through 35e are each illustrations showing steps of a method of using the winder and special features of connection, attachment, coupling and positioning of the winder in interaction with a vehicle cover.
Figure 31A:
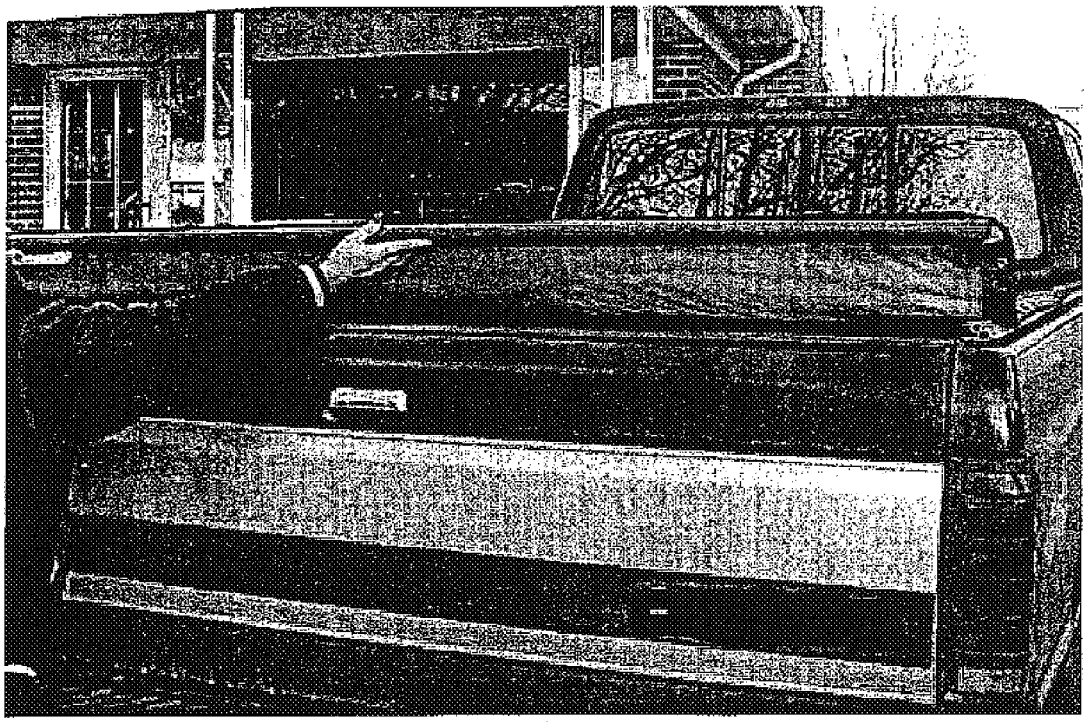
Figure 31B:
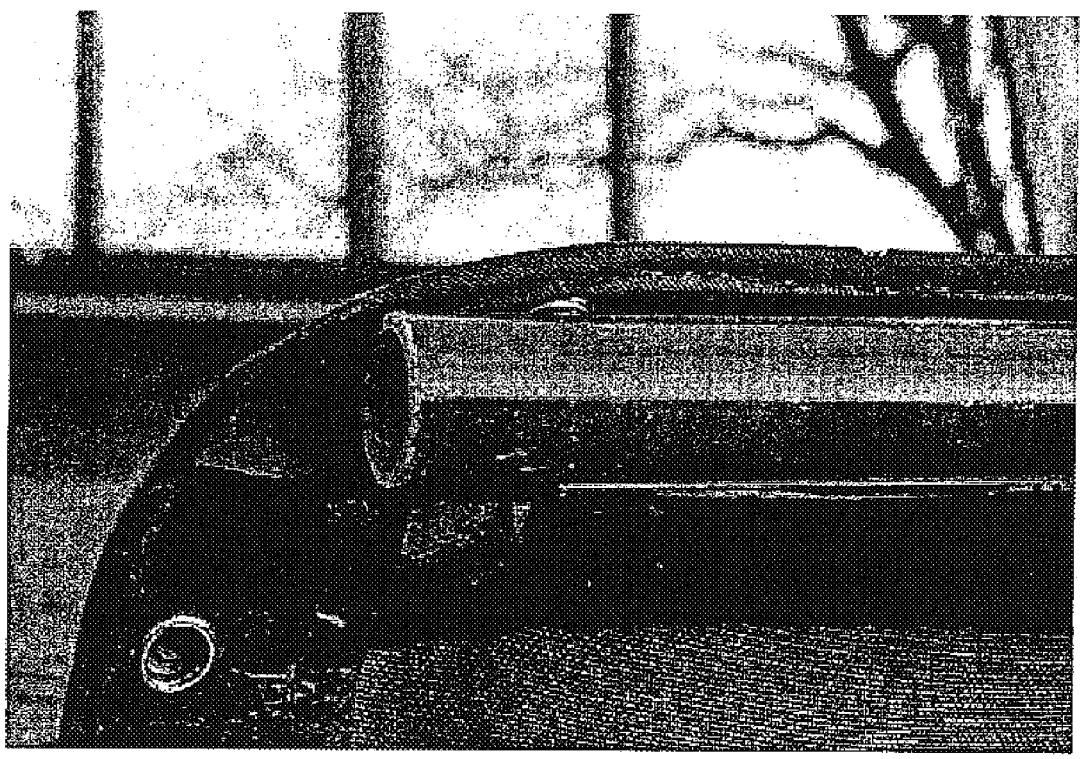
Figure 32:
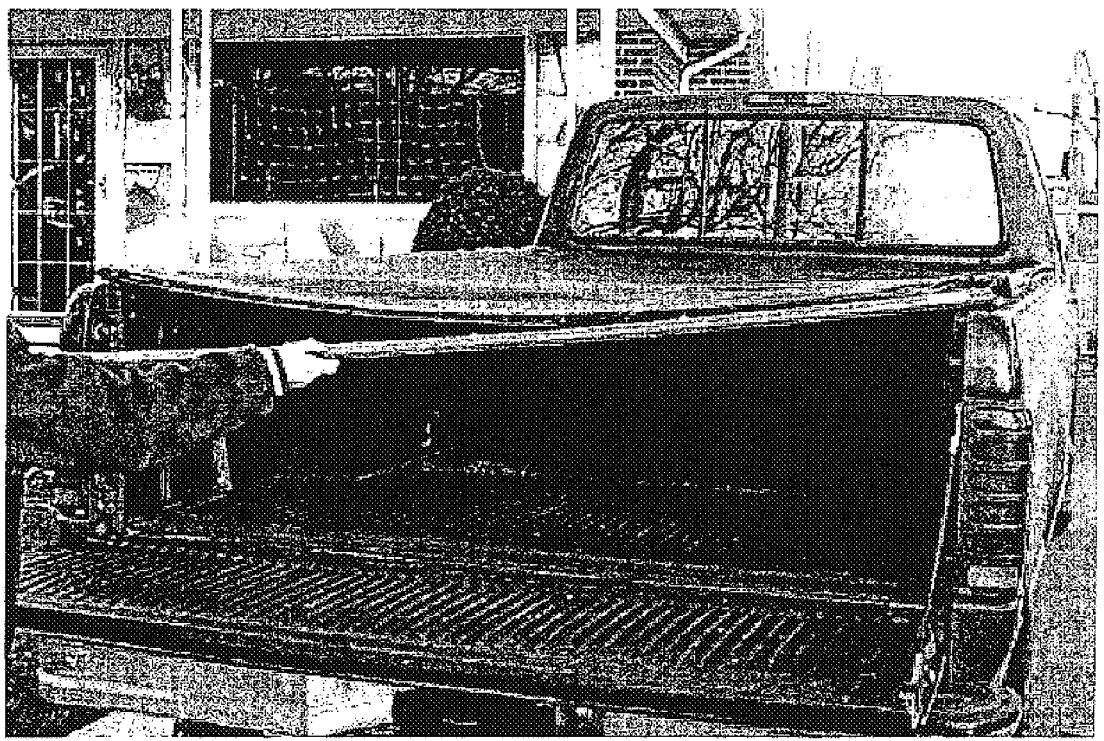
Figure 33:
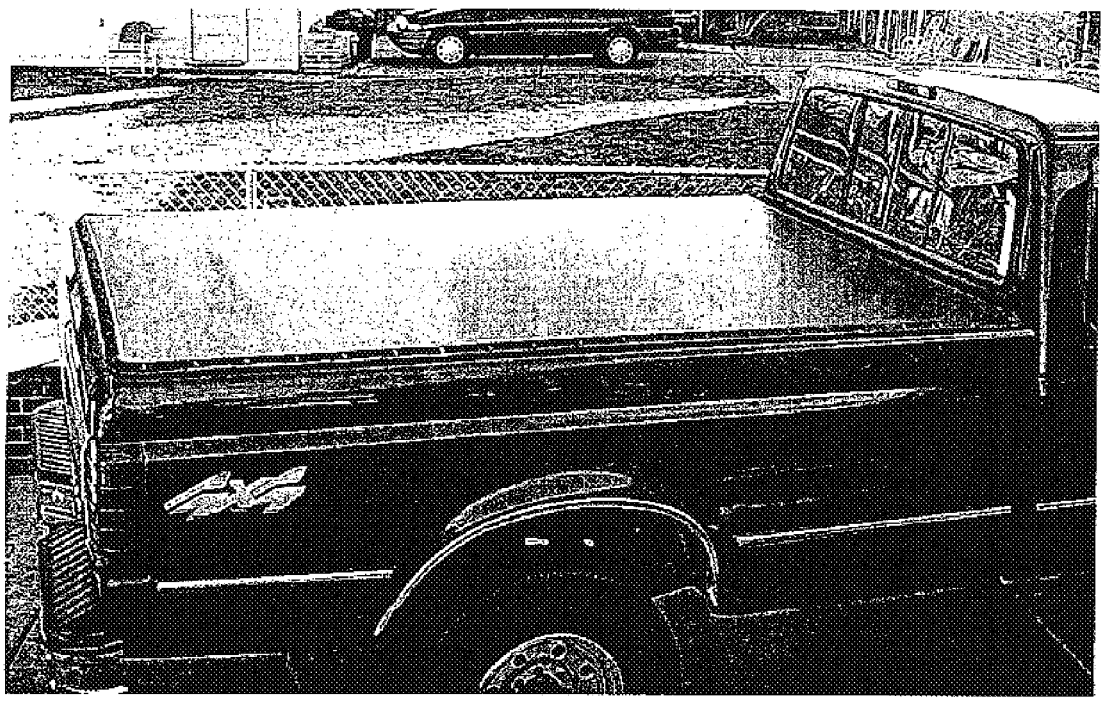
Figure 34:
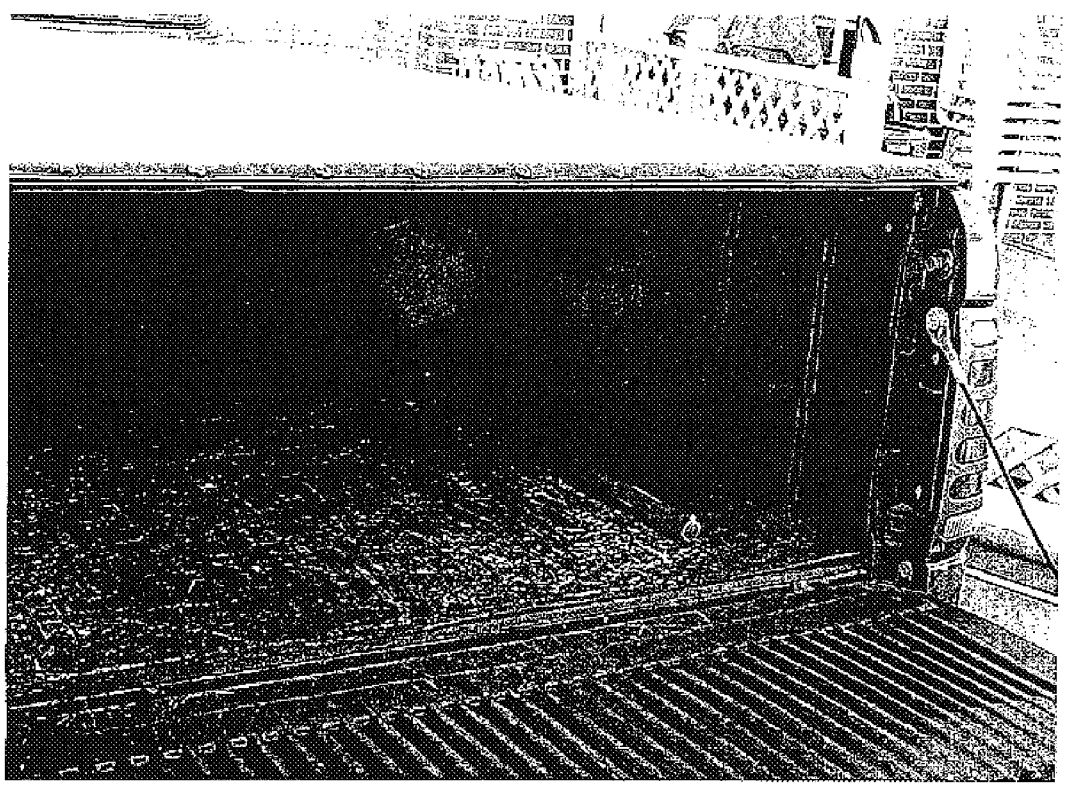
Figure 35B:
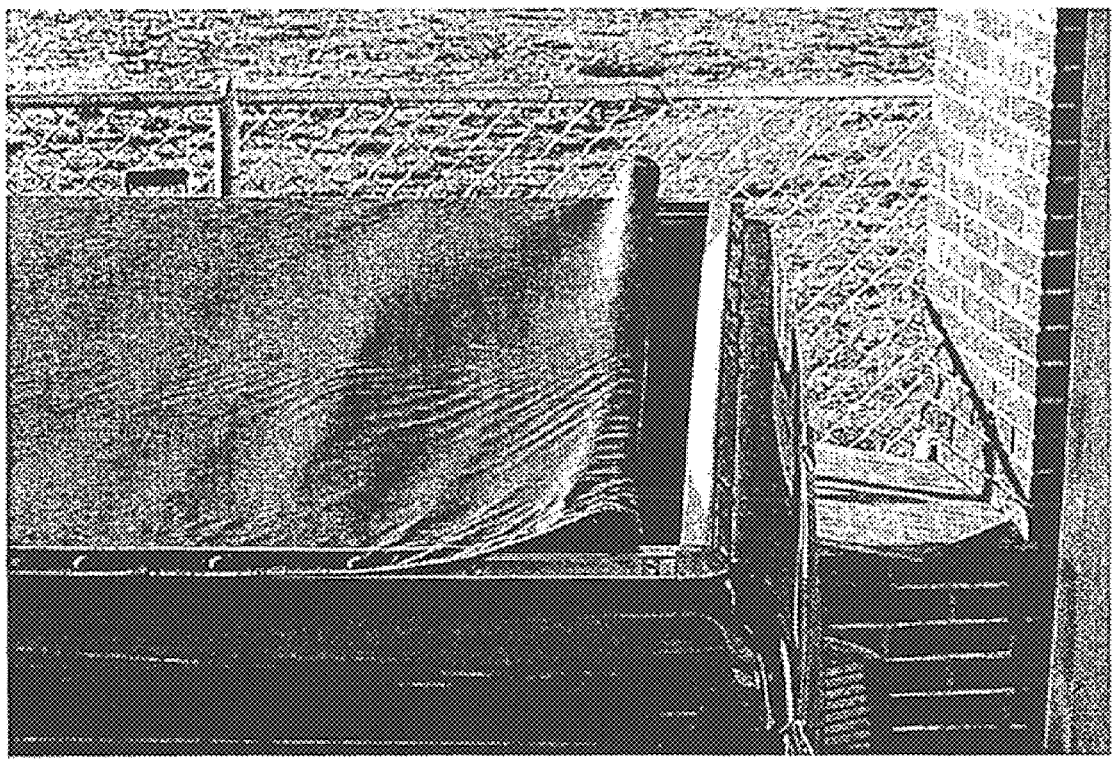
Figure 35C:
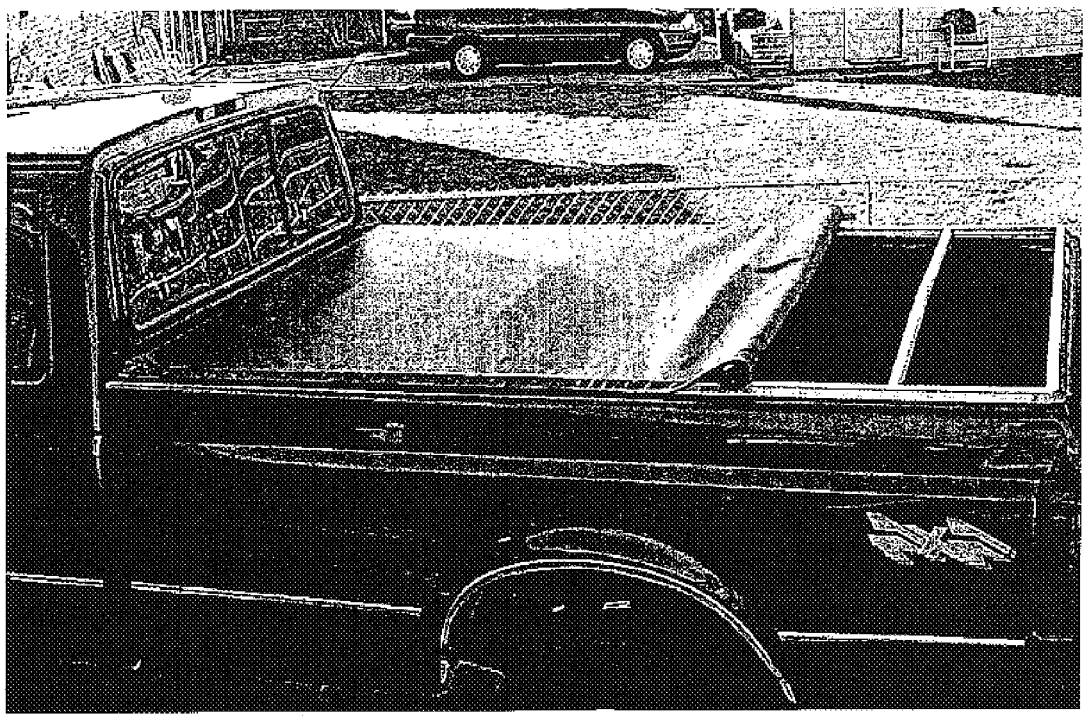
Figure 35D:
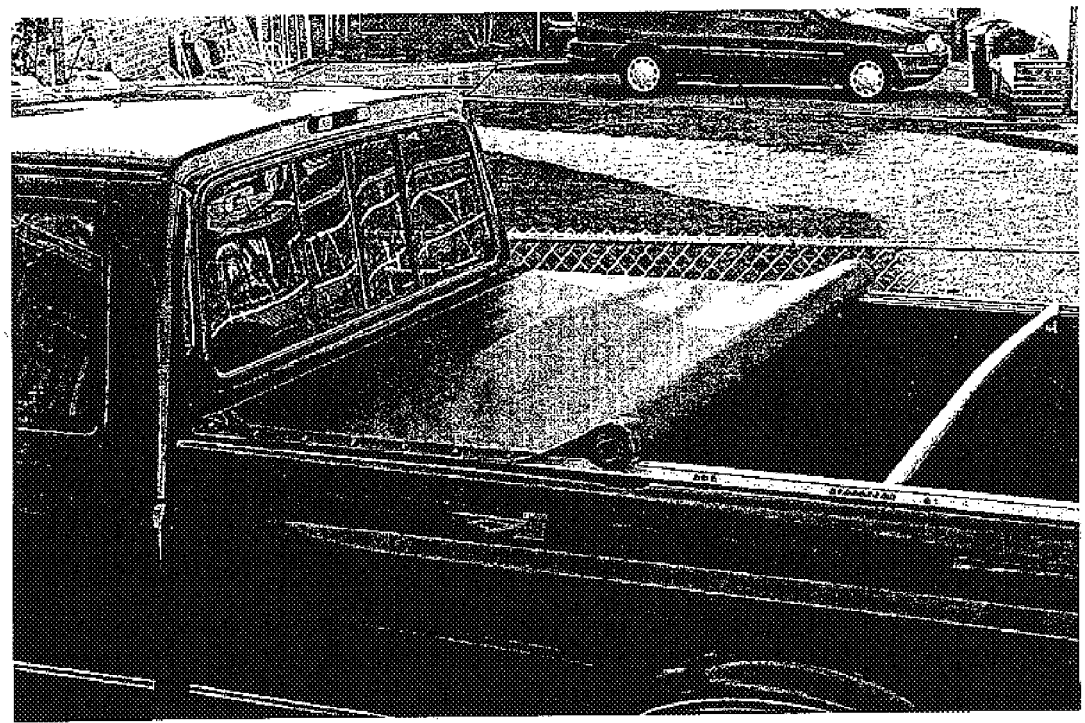
Figure 35E:
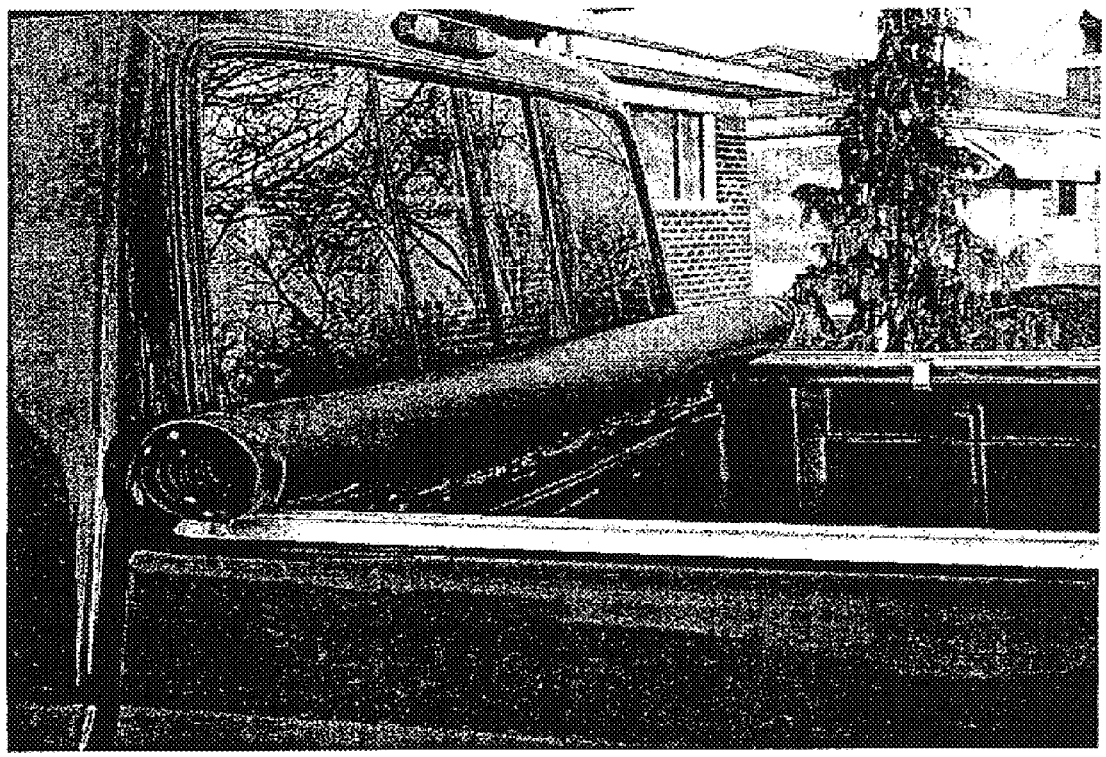

In preferred embodiments of the accessory 10, the installation channel 42h and the installation channel 44h, as illustrated, by example, are connected, one with the other, and are coextensive and concurrent with one another. Also, the middle coupling member 48 of the first base 40, the coupling member 58 of the second base 50 and the coupling member 68 of the third base 60; are each, respectively, fabricated, constructed and provided as male, female or corresponding or complimentary snap components, and are designed, in this respect, to correspond to such snap members being utilized on a number of vehicle tonneau covers. It will, however, be understood, as earlier indicated, in part, that it is well within the scope and spirit of the present invention to provide other diverse types of attachment and coupling members and members to correspond with or otherwise engage and interact with a given tonneau cover in attaching the accessory 10 to it. In this regard, a further example, without limitation, and preferred embodiment of the present invention is shown in FIGS. 23 through 28 with respect to the channeled snap chamber coupling members 48c, 58c and 68c. It is also possible to attach or connect such coupling components or elements to the various base members described, in many secure and fixed ways, or to provide such coupling members as an integral part of the respective base member that each is attached to or a part of. For example, as shown in FIG. 24A, base 46 can have three holes 48b positioned to contain snaps (not shown) in a base having the cross-section of FIG. 12C. The holes can be located in a flattened region of the curves surface. The opposite side of the base 46 of FIG. 24A shown in FIG. 24B has channeled snap chamber coupling members 48c. When two coupling members are present on the base, a single base can couple to different existing tonneau cover fittings. The drawing and illustration Figures show, by example, and by setting forth exemplar parts, that such coupling members can be attached by utilizing a nut (n) (designated in the following drawing illustration numbering by adding "n" to the element number) and bolt (b) (designated in the following drawing illustration numbering by adding "b" to the element number) arrangement; such as is illustrated by example in FIGS. 1 through 8 at elements 26, 28, 26B, 26n, 28b and 28n.

Other means may be used for the fixed or positional attachment of coupling members. It is also within the scope and spirit of the invention, as discussed in part above, to provide more than one coupling attachment member to each of the base members 40, 50 and 60; and to provide pivotable or positional attachment members, or different types of such members on the same base member.

Reference is made to the drawing figure illustrations of FIGS. 1 through 28 and the photographic illustrations of FIGS. 29 through 35e, showing examples of preferred embodiments of the invention. The scope and spirit of the present invention and tonneau accessory 10, in preferred embodiments, sets forth a tonneau bridge rod device having a rod assembly for use in movable interaction with a pickup truck or vehicle tonneau cover installation having available locations for perimeter or other positional attachment; for winding, rolling, guiding, supporting or positioning the tonneau cover in relation to and interaction with a pickup truck/vehicle bed having walls and/or available overhanging support rib/beam members (as shown in the illustrations). Preferred embodiments of the rod assembly can be provided having ported first and second ends and lengthwise laterally walled portions, as illustrated in the drawing and photographic Figures by example. A number of coupling members are attached to the laterally walled portions of the rod assembly; and the accessory 10 is provided with members defined and supported by its rod assembly for varying the positional relationships of the coupling members as they relate to each other. This is shown by example in FIGS. 1 through 8 and 29 through 35e with regard to the first positioning channels 22 and 24, respectively, and the first and second positionable couplings 26 and 28, respectively. It is also illustrated by example in FIGS. 9 through 16B and 20 through 28, with regard to the variable positioning movement of the base members 40, 50 and 60, and their respective coupling members 48, 58 and 68 (and 48c, 58c and 68c) in the various preferred embodiments shown by example.

Figure 17:
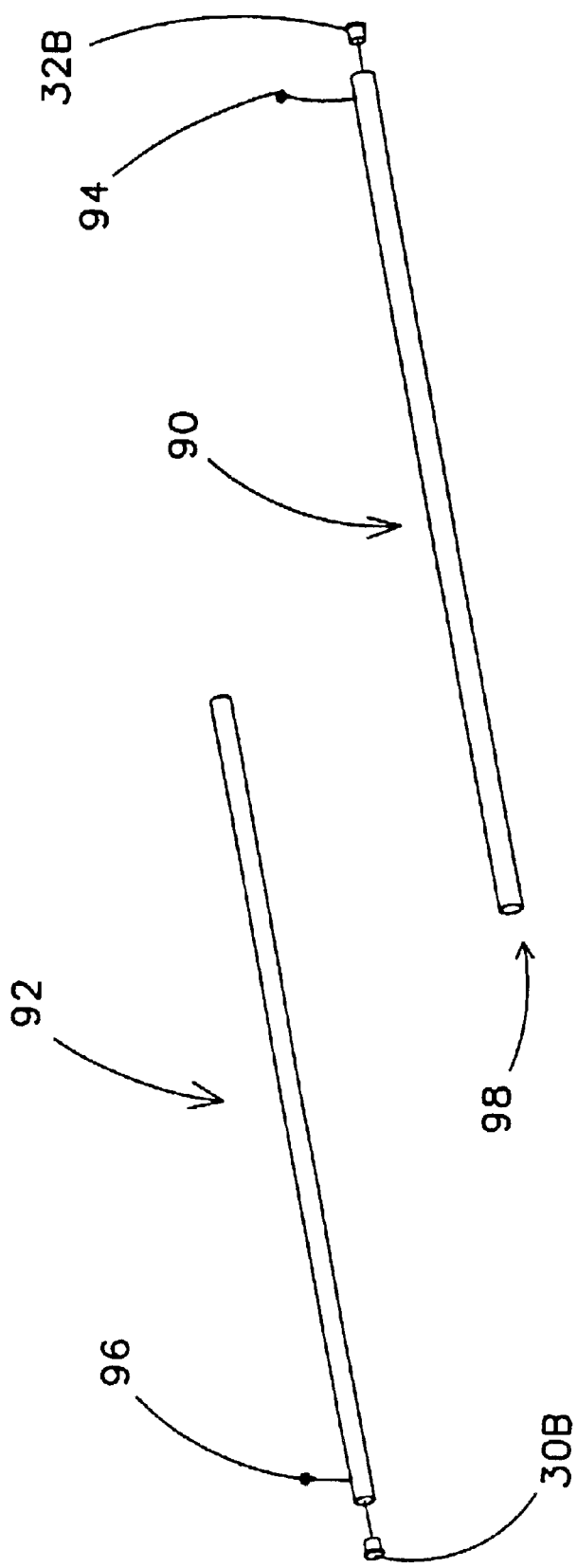
FIG. 17 is another winder, illustrating a two-piece multi-base member assembly.
Figure 18:
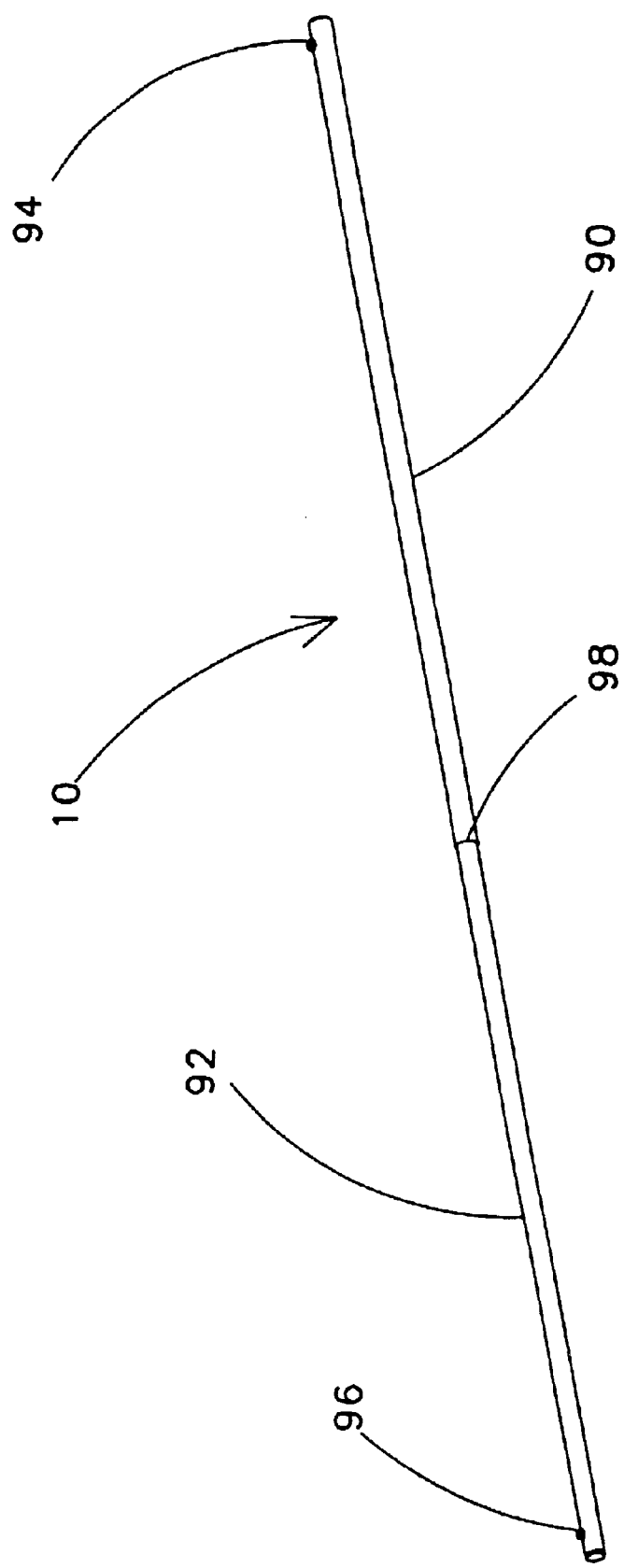
FIG. 18 is a perspective view of a winder of FIG. 17, illustrating an extended positional orientation for installation in interaction with a vehicle cover.
Figure 19:
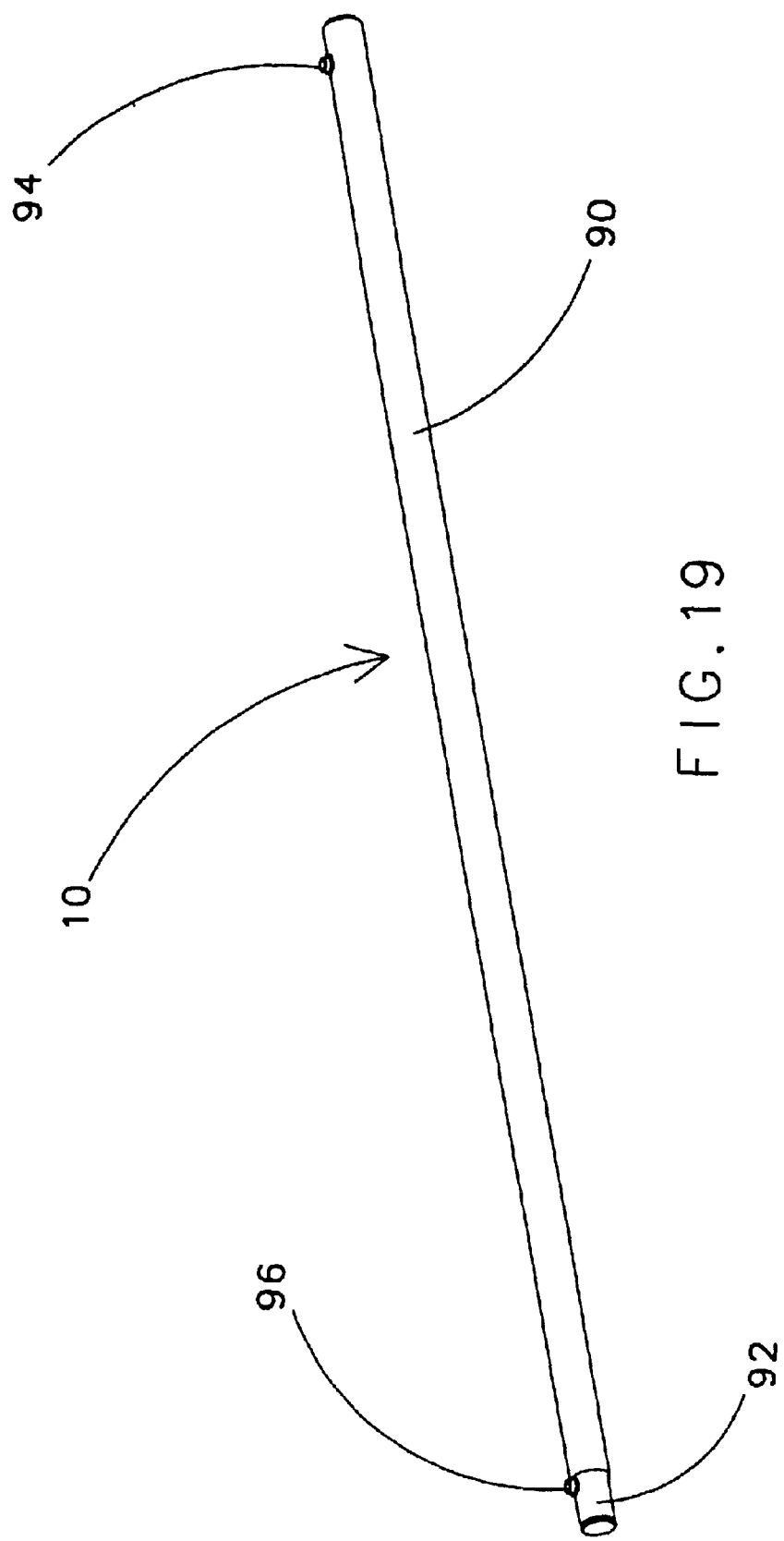
FIG. 19 is another perspective view of a winder of FIG. 17, illustrating a slidably closed or contracted positional orientation for storing or attachment to a smaller cover.
Figure 20:
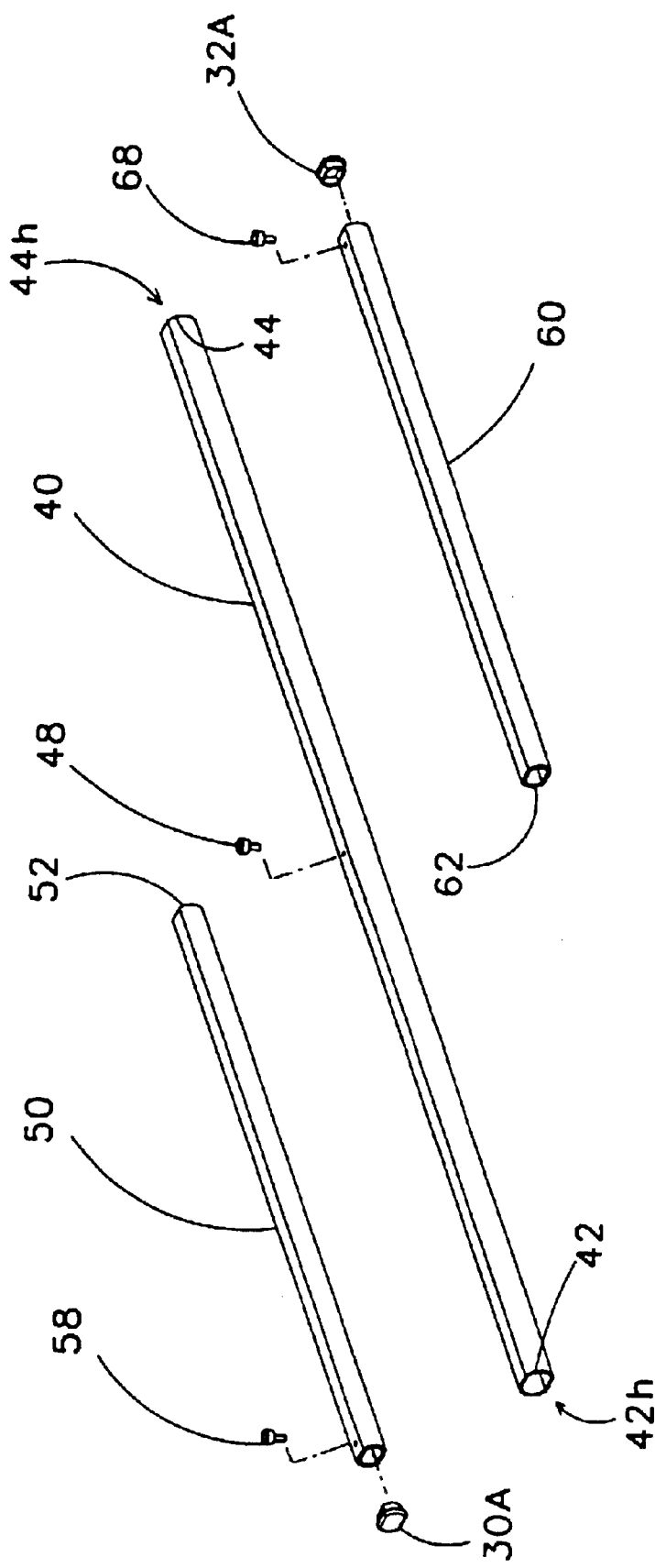
FIG. 20 is a perspective view of another winder.
Figure 21:
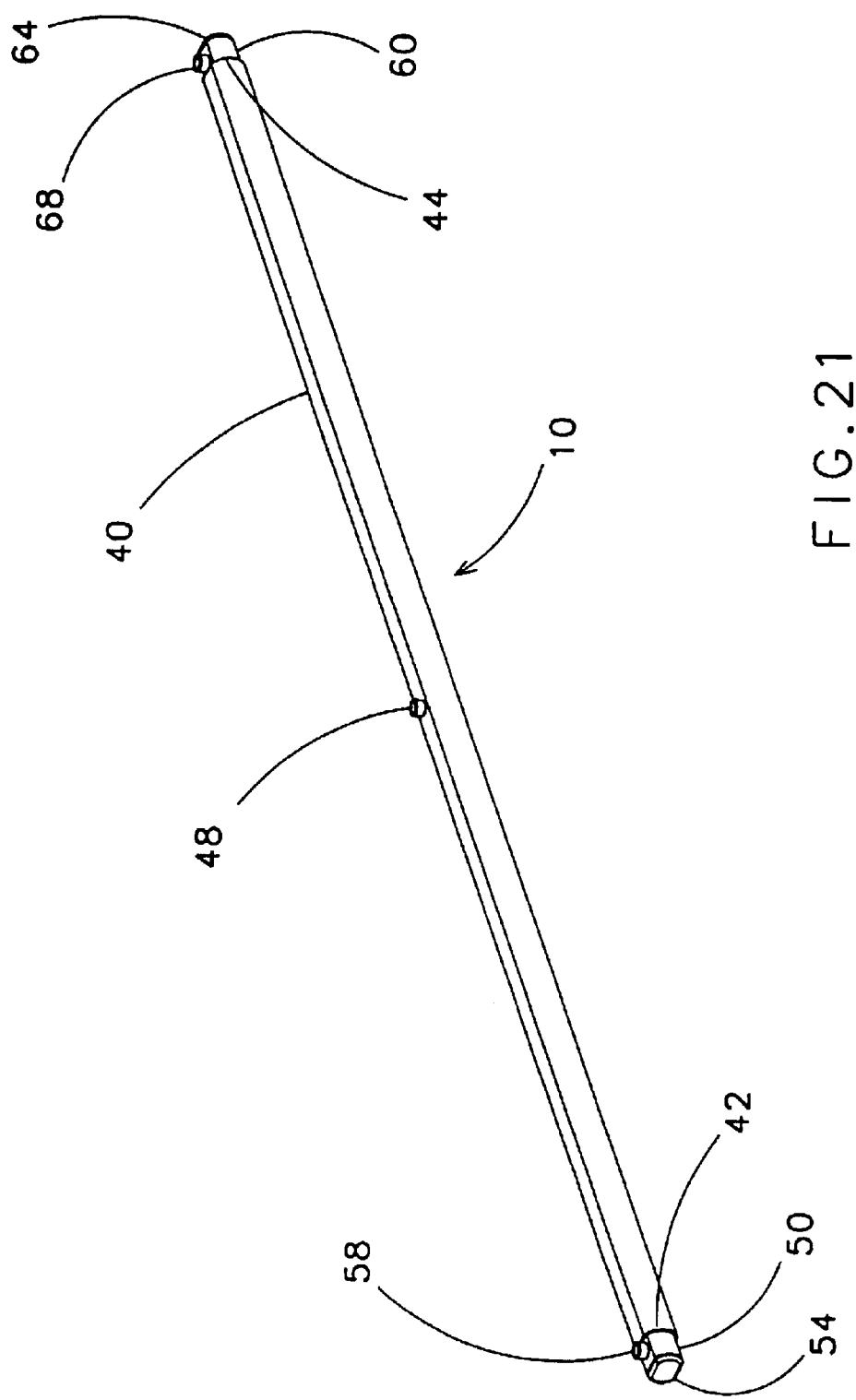
FIG. 21 is a perspective view of a winder of FIG. 20, illustrating a closed or contracted positional orientation.
Figure 22:
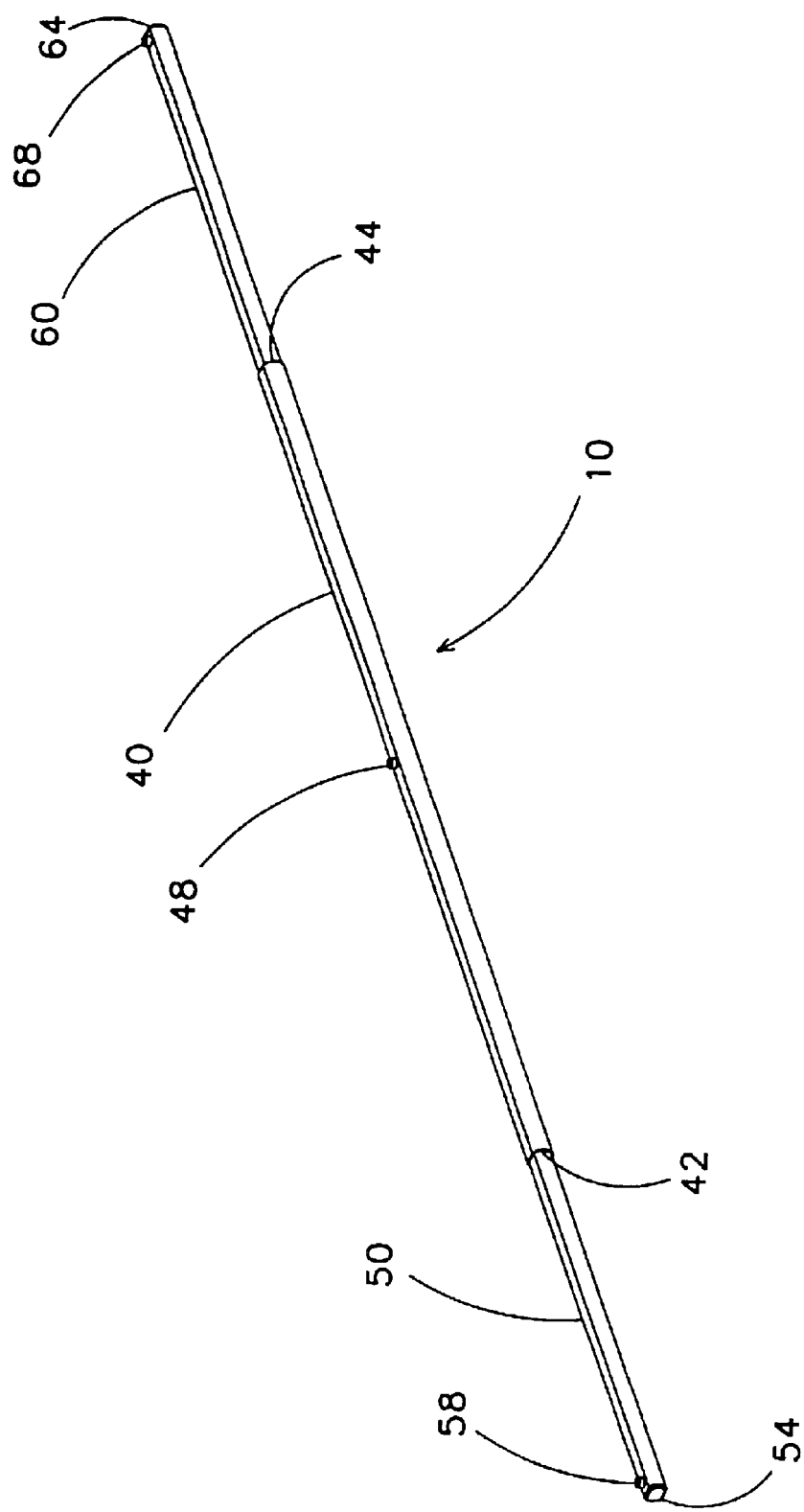
FIG. 22 is a perspective view of a winder of FIG. 20, illustrating an extended positional orientation for installation.
Figure 23:
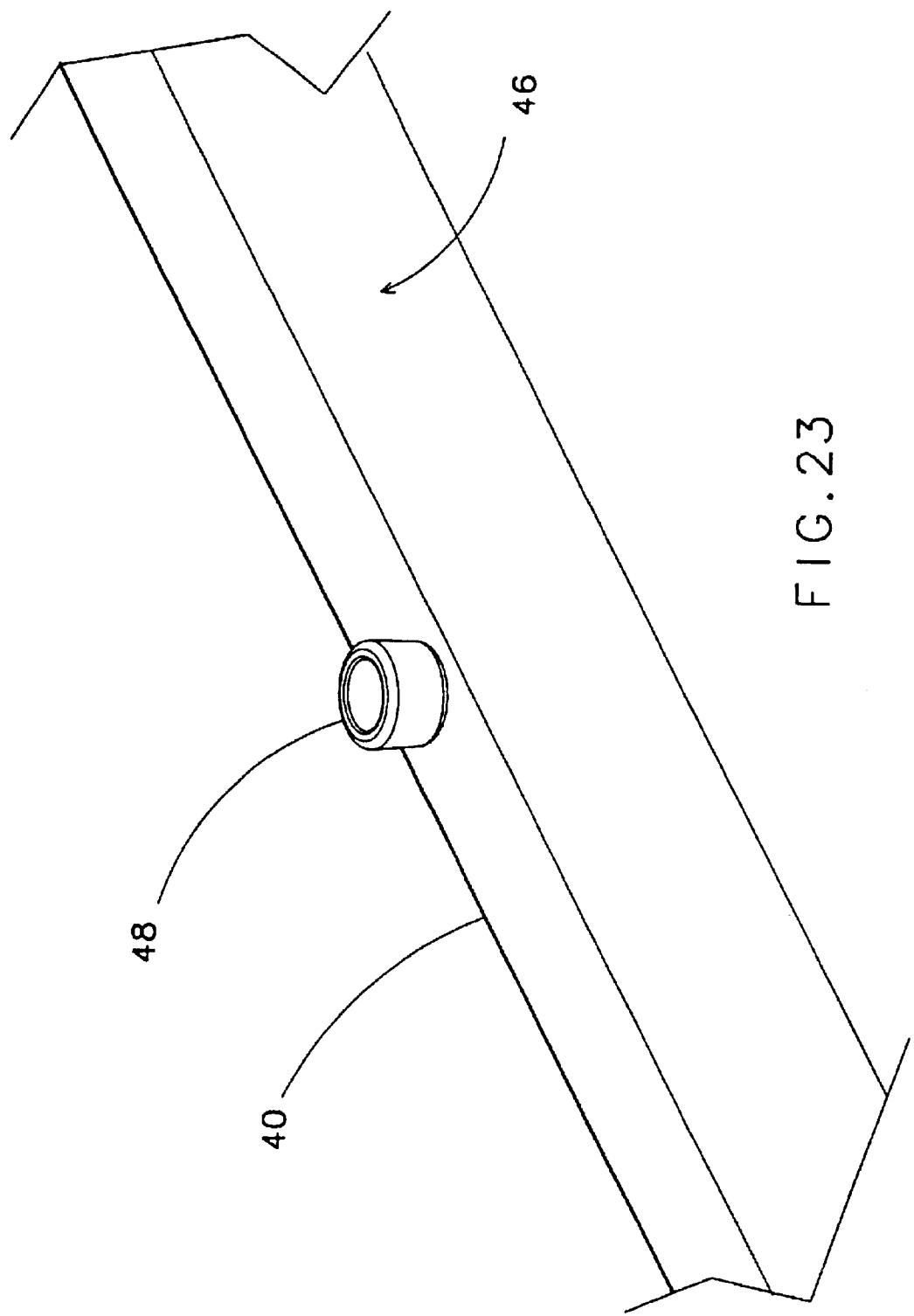
FIG. 23 is an enlarged partial perspective view of the middle base member of a winder of FIG. 20.

Additionally, as illustrated in FIGS. 17 through 19, the first and second base members 90 and 92, respectively, and the first and second coupling members 94 and 96 can be provided with the first base member 92 having ported end 98 for releasable and biasable receipt and installation of the second base 92, as similarly described above and illustrated by example.

In this manner, one or more of the coupling members utilized in the present invention in association with one another can be, optionally, positionally adjusted to readily accommodate and couple with one or more corresponding perimeter coupling locations on a vehicle tonneau cover with which the Tonneau Accessory 10 interacts; and to position and store the tonneau cover in relation to a walled or overhang rib installed vehicle bed storage area (as illustrated by example in FIGS. 29 through 35e).

In a series of related embodiments, the accessory 10 is provided as an adjustable and releasably attachable tonneau winder for use in flowing and suspended interaction (in that it flows with and is partially suspended by the tonneau cover with which it is attached and with which it moves in interaction with the movement of a tonneau cover, as illustrated, by example, in the photographic FIGS. 29 through 35e). The accessory 10 interacts with a pickup truck or vehicle tonneau cover or similar cover, or any covering sheet having installed on any of its perimeters or axes some type of attachment, coupling or cooperating male-female-oriented snap or connection members. The accessory 10 responds in installable use, in complimentary interaction, therefore, with a selected portion of the perimeter or axis attachment members on the tonneau cover or like cover; for winding, rewinding, supporting, guiding and/or positioning the tonneau or cover, while remaining positioned within the tonneau or cover. The accessory 10 also responds in further interaction with, and positional relation to, a pickup truck or walled vehicle bed or storage area; as discussed, and as illustrated in the photographic FIGS. 29 through 35e, by example.

In embodiments, the tonneau accessory 10 (or winder) includes a telescopically extensible base assembly having a central portion and at least one slidably communicating subassembly member; as illustrated, by example, in FIGS. 9 through 28. The central portion of the base assembly and at least one slidably communicating subassembly have a lengthwise outer surfacing; and have and define along the lengthwise outer surfacing at least one respective coupling attachment members or coupling-attachment system or arrangement for engaging and connecting to a vehicle tonneau cover. The assembly is, therefore, positionally adjustable and releasably couple-able to a number of preselected perimeter, point or axis coupling locations which are part and parcel of an attachment or connecting members, arrangement or system provided with a vehicle tonneau cover or like cover or covering.

Throughout the preferred embodiments of the present invention and accessory 10 disclosed, taught and illustrated herein (FIGS. 1 through 35e); various examples of preferred shapes and configurations of the base members and assemblies utilized in the present invention are set forth; such as circular or cylindrical or arcuate, ellipsoid, elliptical and having walls or a configuration which has both linear and arcuate surfaces. It will, therefore, be understood, within the scope and spirit of the present invention, that the perspective, cross-sectional, end view, widthwise or lengthwise configurational aspects of the base members or support members 12, 40, 50, 60, 90 and 92; as well as their associated and included parts and elements (such as the coupling members, etc.) disclosed or illustrated herein; can be provided in many different shapes and configurations.

Reference is now made to FIGS. 29 through 35e. A method for positioning and storing a vehicle tonneau cover having a number of perimeter ends at least two of which have coupling attachment members, in relation to a walled or overhang rib supported vehicle bed storage area of a pickup truck includes releasing and detaching a number of coupling attachment members of a first perimeter end of the vehicle tonneau cover from their installed locations on or proximal to a rear walled portion or overhang rib supported portion of the walled vehicle bed storage area of the pickup truck, attaching the number of coupling attachment members of the first perimeter end of a vehicle tonneau cover along a lengthwise oriented rod member, lifting the rod member in a generally upward motion freeing a plurality of any existing attachment locations of the vehicle tonneau cover from securement to the walled vehicle bed storage area or a overhang rib supported portion, winding the lengthwise oriented rod member in a counter-clockwise manner while moving and positioning the rod member to a front wall of the walled vehicle bed storage area, proximal to a cab area of the pickup truck, so that the vehicle tonneau cover is wrapped about the lengthwise oriented rod member and the rod member, contemporaneously, travels and flows with the vehicle tonneau cover as the tonneau cover is being wrapped and positioned proximal to the cab area of the pickup truck, and storing the vehicle tonneau cover as wrapped in the winding step, and, optionally, positioned proximal to the cab area of the pickup truck, until further positioning or placement is desired.

The method further includes, in part, after the above referenced storing step: winding the lengthwise oriented rod member in a clockwise manner while moving and positioning the rod member to a back wall portion or overhang support rib of the walled vehicle bed storage area, so that as the vehicle tonneau cover is unwrapped from about the rod member and the rod member, the rod member moves and floats, contemporaneously, with the vehicle tonneau cover, in suspension therewithin, as it is being moved and positioned; detaching and releasing the number of coupling attachment members of the first perimeter end of the vehicle tonneau cover from the rod member; attaching the number of coupling attachment members of the first perimeter end of the vehicle tonneau cover to the back wall portion or overhead rib support portion of the walled vehicle bed storage area; removing the rod member; and storing the rod member in a preselected positional storage area in relation to the walled vehicle bed storage area of the pickup truck, as a separate accessory, until needed, and selected for use again.

The following list summarized the reference numbers as used in the drawings.

10 Accessory Tonneau Attachment or Tonneau Accessory or Accessory
12 base support
14 first end of (12)
16 second end of (12)
18 lengthwise lateral wall of (12)
20 middle coupling member of (12)
22 first positioning channel of (12)
24 second positioning channel of (12)
26 first positionable coupling
26b part of first positionable coupling (26) with extending bolt portion
26n part of first positionable coupling (26), corresponding nut portion for threadable or other attachment to (26b)
28 second positionable coupling
28b part of second positionable coupling (28) with extending bolt portion
28n part of second positionable coupling (28), corresponding nut portion for threadable or other attachment to (28b)
30 end member
30A end member (FIG. 9)
30B end member (FIG. 17)
32 end member
32A end member (FIG. 9)
32B end member (FIG. 17)
34 additional coupling
36 additional coupling
40 first base member (another embodiment)
42h installation channel of (40)
42 first end of (40)
44 second end of (40)
44h installation channel of (40)
46 lengthwise laterally walled portion of (40)
48 middle coupling of (40)
48b hole for snap
48c channeled snap chamber coupling member of (40) (another embodiment)
49a set screw or pin
49b set screw or pin
49c set screw or pin
50 second base member
52 end (first) of (50)
54 end (second) of (50)
56 lengthwise laterally walled portion of (50)
58 coupling member of (50)
58c channeled snap chamber coupling member of (50) (another embodiment)
60 third base member
62 end (first) of (60)
64 end (second) of (60)
66 lengthwise laterally walled portion of (60)
68 coupling member of (60)

68c channeled snap chamber coupling member of (60) (another embodiment)
72 dimple projection member of (42)
74 dimple projection member of (44)
76 first projection channel of (50)
78 first projection channel of (60)
79 second projection channel of (50)
80 second projection channel of (60)
81 rail projection member of (42) of (40)
82 rail projection member of (44) of (40)
90 first base member (additional embodiment)
92 second base member
94 first coupling member
96 second coupling member 98 ported end of (90)

Other embodiments are within the claims.

What is claimed is:

1. An adjustable and releasably attachable tonneau winder accessory for use in flowing and suspended interaction with a pick-up truck or vehicle tonneau cover having one or more perimeter attachment members, and in complimentary interaction with a selected portion of the perimeter attachment member, for winding, rewinding, supporting, guiding or positioning the tonneau cover, and in further interaction with, and positional relation to, a pick-up truck or walled vehicle bed or storage area, said adjustable and attachable accessory tonneau winder comprising a telescopically extensible base assembly having a central portion and at least one slidably communicating subassembly member; the central portion and the at least one slidably communicating subassembly member having a lengthwise outer surfacing, and having and defining along said lengthwise outer surfacing at least one respective coupling attachment member for engaging and connecting to a vehicle tonneau cover, and being positionally adjustable and releasably coupleable to a number of preselected perimeter coupling locations including at least one perimeter attachment member of a vehicle tonneau cover.

2. The adjustable and releasably attachable tonneau winder accessory of claim 1, wherein: the central portion of the telescopically extensible base assembly defining and having first and second hollow installation ends, and the at least one slidably communicating subassembly member having first and second ends;

the at least one respective coupling attachment member being attached proximal to the first end of the at least one slidably communicating subassembly member, the second end of said at least one slidably communicating subassembly member being slidably positioned within the first hollow installation end of the central portion; and the at least one respective coupling attachment member being attached to the central portion between the first and second hollow installation ends.

3. The adjustable and releasably attachable tonneau winder accessory of claim 1, wherein: the at least one respective coupling attachment member comprises a respective snap coupling member.

4. The adjustable and releasably attachable tonneau winder accessory of claim 3, wherein: each of the respective snap coupling members are pivotally attached, respectively, along said outer surfacing.

5. The adjustable and releasably attachable tonneau winder accessory of claim 2, wherein: the at least one respective coupling attachment member comprises a respective channeled snap chamber.

6. The adjustable and releasably attachable tonneau winder accessory of claim 2, wherein: the central portion of the telescopically extensible base assembly defining and having first and second hollow installation ends; and the at least one slidably communicating subassembly member comprising first and second slidably communicating subassembly members, each, having first and second ends;

the at least one respective coupling attachment member being attached proximal to the first end of the at first slidably communicating subassembly member, the second end of said first slidably communicating subassembly member being slidably positioned within the first hollow installation end of the central portion;

the at least one respective coupling attachment members being attached proximal to the first end of the second slidably communicating subassembly member, the second end of said second slidably communicating subassembly member being slidably positioned within the first hollow installation end of the central portion; and the at least one respective coupling attachment members being attached to the central portion between the first and second hollow installation ends.

7. The adjustable and releasably attachable tonneau winder accessory of claim 6, wherein: the at least one respective coupling attachment member comprises a respective snap coupling member.

8. The adjustable and releasably attachable tonneau winder accessory of claim 7, wherein: each of the respective snap coupling members are pivotally attached, respectively, along said outer surfacing.

9. The adjustable and releasably attachable tonneau winder accessory of claim 6, wherein: the at least one respective coupling attachment member comprises a respective channeled snap chamber.

10. The adjustable and releasably attachable tonneau winder accessory of claim 1, further comprising a second respective coupling attachment member opposite the respective coupling attachment member.

11. The adjustable and releasably attachable tonneau winder accessory of claim 1, further comprising at least one set screw holding the extensible base assembly and the slidably communicating subassembly member together.

12. The adjustable and releasably attachable tonneau winder accessory of claim 1, wherein the winder is configured to fit in a pocket of the tonneau cover.

13. A floating tonneau cover guiding and supporting device for use in interaction with a tonneau cover having a number of coupling members; and in interaction with a plurality of corresponding, respective, coupling members on a perimeter of a tonneau cover, for securing, rolling, guiding, positioning and storing the tonneau cover in relation to a walled vehicle storage or bed area with which said tonneau cover guiding and supporting device also interacts, said tonneau cover guiding and supporting device comprising:

a first base member having first and second ends and a lengthwise laterally walled portion, and having attachment members for biasably and releasably securing a further member to each of said first and second ends;

a middle coupling member, being fixedly secured to the lengthwise laterally walled portion of the first base member, at a positional orientation which is generally equidistant in relation to the first and second ends of the first base member;

a second base member having first and second ends and a lengthwise laterally walled portion, the first end thereof having members responsive to said attachment members of the first base member, for biasably and releasably attaching the second base member to the first base member;

a coupling member being fixedly secured to the lengthwise laterally walled portion of the second base member, at a general positional orientation which is proximate to the second end of the second base member;

a third base member having first and second ends and a lengthwise laterally walled portion, the first end thereof having members responsive to said attachment members of the first base member, for biasably and releasably attaching the third base member to the first base member; and a coupling member being fixedly attached to the lengthwise laterally walled portion of the third base member, at a general positional orientation which is proximate to the second end of the third base member, the first end of the second base member being slidably and biasably attached to the first end of the first base member, and the first end of the third base member being slidably and biasably attached to the second end of the first base member, such that the middle coupling member of the first base member, the coupling member of the second base member and the coupling member of the third base member are, each, in general axial alignment with one another.

14. The floating tonneau cover guiding and supporting device of claim 13, wherein: the first base member defining a first installation channel extending from the first end thereof, therewithin, and the second end, thereof, defining a second installation channel extending therewithin; the first end of the second base member being dimensioned to slidably fit within the first end of the first base member, and the first end of the third base member being dimensioned to slidably fit within the second end of the first base member.

15. The floating tonneau cover guiding and supporting device of claim 14, wherein: the first end of the first base member defines a dimple projection member, extending from the lengthwise laterally walled portion into the first installation channel; and the second end of the first base member defines a dimple projection member, extending from the lengthwise laterally walled portion into the second installation channel; the respective dimple members of the first and second ends of the first base member comprising the attachment members thereof.

16. The floating tonneau cover guiding and supporting device of claim 15, wherein: the lengthwise laterally walled portion of the first end of the second base member defines within its surface a first projection channel, being generally transverse in positional orientation to the axial alignment of the coupling member of the second end thereof; said first projection channel comprising the members responsive to said attachment members of the first base member, for biasably and releasably attaching the second base member to the first base member; and the lengthwise laterally walled portion of the first end of the third base member defines within its surface a first projection channel, being generally transverse in positional orientation to the axial alignment of the coupling member of the second end thereof; said first projection channel comprising the members responsive to said attachment members of the first base member, for biasably and releasably attaching the third base member to the first base member.

17. The floating tonneau cover guiding and supporting device of claim 16, wherein: the lengthwise laterally walled portion of the first end of the second base member further defines within its surface a second projection channel, being generally transverse in positional orientation to the axial alignment of the coupling member of the second end of said second base member, and distanced and generally opposite to the first projection channel, said second projection channel comprising further elements of the members responsive to said attachment members of the first base member, for biasably and releasably attaching the second base member to the first base member; and the lengthwise laterally walled portion of the first end of the third base member further defines within its surface a second projection channel, being generally transverse in positional orientation to the axial alignment of the coupling member of the second end of said third base member, and distanced and generally opposite to the first projection channel thereof, said second projection channel comprising further elements of the members responsive to said attachment members of the first base member, for biasably and releasably attaching the third base member to the first base member.

18. The floating tonneau cover guiding and supporting device of claim 17, wherein: the lengthwise laterally walled portion of the first end of the first base member further defines and has a projection rail member extending within the first installation channel, therewithin, being placed in a positional orientation opposite and spaced in relation to the dimple projection member thereof; and the lengthwise laterally walled portion of the second end of the first base member further defines and has a projection rail member extending within the second installation channel, therewithin, being placed in a positional orientation opposite and spaced in relation to the dimple projection member thereof;

the respective projection rail members of the first and second ends of the first base member further comprising the attachment members of said first base member.

19. The floating tonneau cover guiding and supporting device of claim 14, wherein: the first installation channel and the second installation channel of said first base member communicate, and are coextensive, with one another.

20. The floating tonneau cover guiding and supporting device of claim 18, wherein: the middle coupling member of the first base member, the coupling member of the second base member and the coupling member of the third base member, respectively, are, each, female snap components.

21. The floating tonneau cover guiding and supporting device of claim 18, further comprising:

a central lateral coupling member being fixedly secured to the lengthwise laterally walled portion of the second base member at a positional orientation generally equidistant in relation to the first and second ends thereof.

22. The floating tonneau cover guiding and supporting device of claim 21, further comprising:

a central lateral coupling member being fixedly secured to the lengthwise laterally walled portion of the third base member at a positional orientation which is generally equidistant in relation to the first and second ends thereof.

23. The floating tonneau cover guiding and supporting device of claim 22, wherein: the middle coupling member of the first base member, the coupling member and the central lateral coupling member of the second base member, and the coupling member and the central lateral coupling member of the third base member, respectively, are, each, female snap components.

24. A tonneau bridge rod device for use in movable interaction with a pickup truck or vehicle tonneau cover installation having available or preselected perimeter coupling members, and in complimentary interaction with a number of such coupling members; for winding, rolling, guiding, supporting or positioning the tonneau cover in interaction with, and relation to, a vehicle bed or storage area; said tonneau bridge rod device comprising:

a rod assembly having ported first and second ends, and a lengthwise laterally walled portion;

a plurality of coupling installation members, attached to, and supported by, the lengthwise laterally walled portion of the rod assembly; and members defined and supported by the rod assembly for varying the axial positional relationship of at least one of said, respective, coupling installation members, in relation to the position of another of said, respective, coupling installation members;

whereby one and more of said coupling installation members can be, optionally, positionally adjusted to readily accommodate and couple with one and more corresponding perimeter coupling members on a tonneau cover with which the tonneau template rod device interacts.

25. The tonneau bridge rod device of claim 24, wherein: the members defined and supported by the rod assembly consists of:

the lengthwise laterally walled portion defining at least one fluted area; and, as a part thereof, at least one coupling installation member being positionably installed within the at least one fluted area.

26. The tonneau bridge rod device of claim 24, wherein: the lengthwise laterally walled portion defines a plurality of fluted areas; and one of the coupling installation members is, respectively, positionably installed within each of the at least one fluted area.

27. The tonneau template rod device of claim 24, wherein: the members thereof comprise:

a respective, extensible member being positionably attached to at least one of either of the ported first and second ends; and at least one of said coupling installation members being attached to the, respective, extensible member.

28. The tonneau template rod device of claim 24, wherein: each of the coupling installation members comprises a snap component.

29. The tonneau template rod device of claim 24, wherein: each of the coupling installation members comprises a snap chamber.

30. An elongate tonneau device for use in combination with a vehicle cover having available or preselected attachment areas thereon for fixed attachment of said elongate tonneau device; for winding, rolling, guiding, supporting or positioning the vehicle cover in interaction with, and relation to, a vehicle bed or storage area; said elongate tonneau device comprising:

a rod assembly having ported first and second ends, and a lengthwise laterally walled portion;

members for fixedly attaching areas of the vehicle cover to said rod assembly; and members defined and supported by the rod assembly for varying the extensible positional relationship of the lengthwise laterally walled portion.

31. A method for positioning and storing a vehicle tonneau cover having a number of perimeter ends at least two of which have coupling attachment members, in relation to a walled or overhang rib supported vehicle bed storage area comprising:

releasing and detaching a coupling attachment member of a first perimeter end of the vehicle tonneau cover from their installed locations on or proximal to a rear walled portion or overhang rib supported portion of the walled vehicle bed storage area;

attaching the coupling attachment member of the first perimeter end of the vehicle tonneau cover along a lengthwise oriented rod member;

lifting the rod member in a generally upward motion freeing a plurality of any existing attachment locations of the vehicle tonneau cover from securement to the walled vehicle bed storage area or a overhang rib supported portion;

winding the lengthwise oriented rod member in a counter-clockwise manner while moving and positioning the rod member to a front wall of the walled vehicle bed storage area.

32. The method of claim 31, further comprising wrapping the tonneau cover about the lengthwise oriented rod member and the rod member, contemporaneously, as the tonneau cover is being wrapped and positioned proximal to the cab area of the pickup truck, and storing the vehicle tonneau cover as wrapped during winding, and, optionally, positioning the wound cover proximal to the cab area of the pickup truck, until further positioning or placement is desired.

33. The method of claim 31, further comprising winding the lengthwise oriented rod member in a clockwise manner while moving and positioning the rod member to a back wall portion or overhang support rib of the walled vehicle bed storage area, so that as the vehicle tonneau cover is unwrapped from about the rod member and the rod member, the rod member moves and floats, contemporaneously, with the vehicle tonneau cover, in suspension therewithin, as it is being moved and positioned; detaching and releasing the number of coupling attachment members of the first perimeter end of the vehicle tonneau cover from the rod member;

attaching the number of coupling attachment members of the first perimeter end of the vehicle tonneau cover to the back wall portion or overhead rib support portion of the walled vehicle bed storage area; removing the rod member; and storing the rod member in a preselected positional storage area in relation to the walled vehicle bed storage area.

34. The method of claim 31, further comprising adjusting a length of the shaft.

* * * * *